United States Patent
Kidera et al.

(10) Patent No.: US 11,451,163 B2
(45) Date of Patent: Sep. 20, 2022

(54) POWER CONVERTER

(71) Applicant: Panasonic Intellectual Property Management Co., Ltd., Osaka (JP)

(72) Inventors: Kazunori Kidera, Osaka (JP); Kenji Hanamura, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 319 days.

(21) Appl. No.: 16/753,475

(22) PCT Filed: Sep. 13, 2018

(86) PCT No.: PCT/JP2018/034026
§ 371 (c)(1),
(2) Date: Apr. 3, 2020

(87) PCT Pub. No.: WO2019/069654
PCT Pub. Date: Apr. 11, 2019

(65) Prior Publication Data
US 2021/0367532 A1    Nov. 25, 2021

(30) Foreign Application Priority Data

Oct. 6, 2017   (JP) .............................. JP2017-195667
Oct. 6, 2017   (JP) .............................. JP2017-195668

(51) Int. Cl.
*H02M 7/25*   (2006.01)
*H02M 7/537*  (2006.01)

(52) U.S. Cl.
CPC .................. *H02M 7/537* (2013.01)

(58) Field of Classification Search
None
See application file for complete search history.

(56) References Cited

U.S. PATENT DOCUMENTS 9,001,544 B2   4/2015 Itoh
9,780,658 B2  10/2017 Eckel et al.
(Continued)

FOREIGN PATENT DOCUMENTS

JP        5626293 B     11/2014
JP   2015-091179 A      5/2015

OTHER PUBLICATIONS

International Search Report for corresponding Application No. PCT/JP2018/034026, dated Nov. 13, 2018.
(Continued)

*Primary Examiner* — Adi Amrany
*Assistant Examiner* — Esayas G Yeshaw
(74) *Attorney, Agent, or Firm* — Renner, Otto, Boisselle & Sklar, LLP

(57) ABSTRACT

A power converter 10 includes: flying capacitor circuits 11 and 12 connected in series so as to be in parallel with a DC power supply; flying capacitor circuits 13 and 14 connected in series so as to be in parallel with the DC power supply; switching elements S1 and S2 connected in series between output terminals of the flying capacitor circuits 11 and 12; switching elements S3 and S4 connected in series between output terminals of the flying capacitor circuits 13 and 14; a first output end OUT1 provided at a midpoint between the switching elements S1 and S2; and a second output end OUT2 provided at a midpoint between the switching elements S3 and S4, wherein a node between the flying capacitor circuits 11 and 12 and a node between the flying capacitor circuits 13 and 14 are connected to a midpoint of a DC power supply voltage.

14 Claims, 12 Drawing Sheets

(56) References Cited

U.S. PATENT DOCUMENTS

| | | | |
|---|---|---|---|
| 2014/0063884 A1 | 3/2014 | Itoh | |
| 2015/0249403 A1* | 9/2015 | Sato | |
| 2021/0367532 A1* | 11/2021 | Kidera | H02M 7/483 |
| 2021/0384815 A1* | 12/2021 | Kolar | H02M 1/14 |
| 2021/0408889 A1* | 12/2021 | Zhu | B60L 15/08 |
| 2022/0021312 A1* | 1/2022 | Hirokawa | H02M 3/33571 |
| 2022/0103088 A1* | 3/2022 | Slepchenkov | H02J 3/38 |

OTHER PUBLICATIONS

Rodriguez, J. et al., "Multilevel Converters: An Enabling Technology for High-Power Applications", Proceedings of the IEEE, New York, Nov. 1, 2009, vol. 97, No. 11, pp. 1786-1817.

European Office Action dated Jun. 7, 2022 corresponding to European Patent Application No. 18865083.2.

* cited by examiner

POWER CONVERTER

TECHNICAL FIELD

The present disclosure relates to a power converter.

BACKGROUND ART

In power conditioners connected to an inverter motor, a solar power generation system, a storage battery, a fuel cell, or the like, a power converter including a multi-level inverter is used (e.g., patent literature 1).

FIG. 12 is a circuit diagram of an inverter apparatus shown in FIG. 2 of patent document 1. An inverter apparatus 101 includes a first input end IN1, a second input end IN2 that receive an input of a DC power supply voltage, a first output end OUT1 and a second output end OUT2 that output an AC voltage. A first three-level circuit 121 is connected between the first input end IN1 and the ground, a second three-level circuit 122 is connected between the second input end IN2 and the ground, and a bridge clamping circuit 130 is connected between the first three-level circuit 121 and the second three-level circuit 122.

Vdc/2 is applied to the first input end IN1, and −Vdc/2 is applied to the second input end IN2. The potential at the output end of the first three-level circuit 121 is in a range Vdc/2-0, and the potential at the output end of the second three-level circuit 122 is in a range 0--Vdc/2. Therefore, the inverter apparatus 101 functions as a five-level circuit that performs voltage conversion by using five voltage levels by means of the first three-level circuit 121 and the second three-level circuit 122.

The bridge clamping circuit 130 switches between a state (first state) of connecting (clamping) the output of the first three-level circuit 121 to the first output end OUT1 via an inductor L1 and connecting (clamping) the output of the second three-level circuit 122 to the second output end OUT2 via an inductor L2 and a state (second state) of connecting (clamping) the output of the first three-level circuit 121 to the second output end OUT2 via the inductor L2 and connecting (clamping) the output of the second three-level circuit 122 to the first output end OUT1 via the inductor L1. The first state corresponds to the first half in a cycle of the power supply frequency, and the second state corresponds to the second half of a cycle of the power supply frequency.

[Patent Literature 1] Japanese Patent 5626293

SUMMARY OF INVENTION

Technical Problem

In the inverter apparatus disclosed in patent literature 1, two three-level flying capacitor circuits are connected in series. Therefore, switching elements having a low withstand voltage can be used for each of switching elements S1-S8, but switching elements having a high withstand voltage need be used for switching elements S1U, S2U, S1W, S2W forming the bridge clamping circuit 130 in the output stage. We have become aware of a need to develop a power converter in which switching elements having a low withstand voltage that are less expensive and offer higher performance can be used for the switching elements in the output stage.

The disclosure addresses an issue in the related art, and a general purpose thereof is to provide a power converter that is less expensive and offers higher performance.

Solution to Problem

The power converter according to an embodiment of the present disclosure includes: a first flying capacitor circuit and a second flying capacitor circuit connected in series so as to be in parallel with a DC power supply; a third flying capacitor circuit and a fourth flying capacitor circuit connected in series so as to be in parallel with the DC power supply and the first flying capacitor circuit and the second flying capacitor circuit connected in series; a first switching element and a second switching element connected in series between output terminals of the first flying capacitor circuit and the second flying capacitor circuit; a third switching element and a fourth switching element connected in series between output terminals of the third flying capacitor circuit and the fourth flying capacitor circuit; a first output terminal provided at a midpoint between the first switching element and the second switching element connected in series, and a second output terminal provided at a midpoint between the third switching element and the fourth switching element connected in series, wherein a node between the first flying capacitor circuit and the second flying capacitor circuit and a node between the third flying capacitor circuit and the fourth flying capacitor circuit are connected to a midpoint of the DC power supply voltage, and an AC power is output from the first output terminal and the second output terminal.

The power converter according to another embodiment of the present disclosure includes: a first flying capacitor circuit and a second flying capacitor circuit connected in series so as to be in parallel with a DC power supply; a third flying capacitor circuit and a fourth flying capacitor circuit connected in series so as to be in parallel with the DC power supply and the first flying capacitor circuit and the second flying capacitor circuit connected in series; a first switching element and a second switching element connected in series between output terminals of the first flying capacitor circuit and the second flying capacitor circuit; a third switching element and a fourth switching element connected in series between output terminals of the third flying capacitor circuit and the fourth flying capacitor circuit; a first output terminal provided at a midpoint between the first switching element and the second switching element connected in series, and a second output terminal provided at a midpoint between the third switching element and the fourth switching element connected in series, wherein a node between the first flying capacitor circuit and the second flying capacitor circuit and a node between the third flying capacitor circuit and the fourth flying capacitor circuit are connected to a midpoint of a DC power supply voltage, an AC power is output from the first output terminal and the second output terminal, a difference between an output voltage of the first flying capacitor circuit and an output voltage of the second flying capacitor circuit and a difference between an output voltage of the third flying capacitor circuit and an output voltage of the fourth flying capacitor circuit are controlled to be half the DC power supply voltage or smaller, the first switching element, the second switching element, the third switching element, and the fourth switching element are controlled to operate when a polarity of the AC power output from the first output terminal and the second output terminal is switched, and switching patterns of switching elements forming the first flying capacitor circuit, the second flying capacitor circuit, the third flying capacitor circuit, and the fourth flying capacitor circuit induced to output a voltage half the DC power supply voltage from the first output terminal and the second output terminal include a first switching pattern in which a flying capacitor forming the first flying capacitor circuit, the second flying capacitor circuit, the third flying capacitor circuit, or the fourth flying capacitor circuit is charged and a second switching pattern in which the flying capacitor is discharged.

Advantageous Effects of Invention

According to the present disclosure, a power converter that is less expensive and offers higher performance is provided.

DESCRIPTION OF EMBODIMENTS

Figure 1:
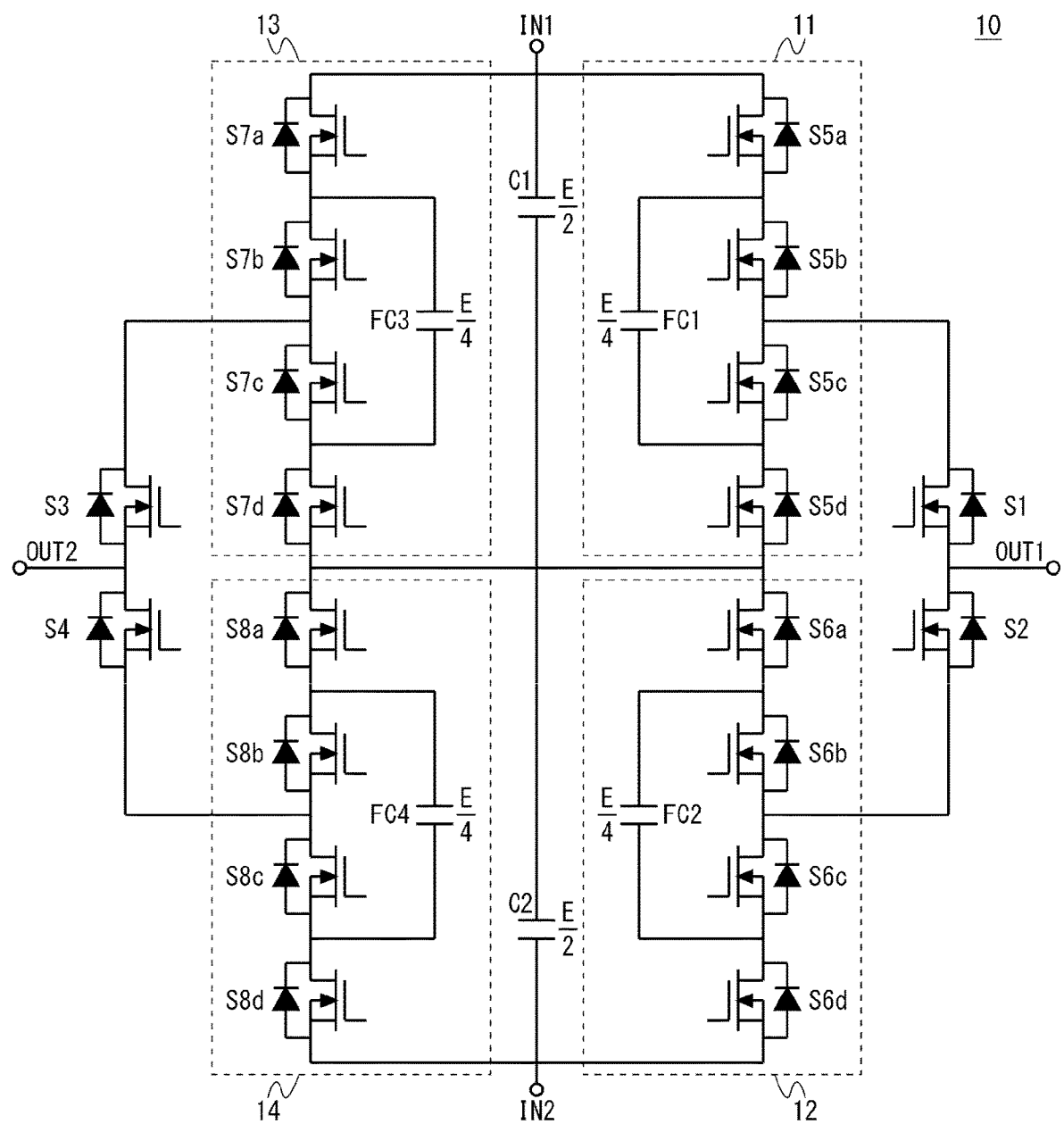
FIG. 1 is a circuit diagram of a power converter according to a first embodiment of the present disclosure.

FIG. 1 is a circuit diagram of a power converter according to a first embodiment of the present disclosure. The power converter 10 includes a first input end IN1 and a second input end INS2 that receive an input of a DC power supply voltage, a first flying capacitor circuit 11 and a second flying capacitor circuit 12 connected in series so as to be in parallel with a DC power supply, a third flying capacitor circuit 13 and a fourth flying capacitor circuit 14 connected in series so as to be in parallel with the DC power supply and the first flying capacitor circuit 11 and the second flying capacitor circuit 12 connected in series, a first switching element S1 and a second switching element S2 connected in series between output terminals of the first flying capacitor circuit 11 and the second flying capacitor circuit 12, a third switching element S3 and a fourth switching element S4 connected in series between output terminals of the third flying capacitor circuit 13 and the fourth flying capacitor circuit 14, a first output end OUT1 provided at a midpoint between the first switching element S1 and the second switching element S2 connected in series, and a second output end OUT2 provided at a midpoint between the third switching element S3 and the fourth switching element S4 connected in series.

In the following description, the operation in which a DC power supply voltage is input at the first input end IN1 and the second input end IN2, and an AC power is output from the first output end OUT1 and the second output end OUT2 will be mainly described. However, the power converter 10 is bidirectional, and it is possible to feed power from the AC side to the DC side. In that case, the input and the output are reversed. The first output end OUT1 and the second output end OUT2 will be the first input end IN1 and the second input end IN2, and the first input end IN1 and the second input end IN2 will be the first output end OUT1 and the second output end OUT2.

In the power converter 10 shown in FIG. 1, three-level circuits capable of outputting three levels of voltage are used as the first-fourth flying capacitor circuits. As will be described later, however, multi-level circuits capable of outputting (2N+3) levels (N is a natural number) may be used as the first-fourth flying capacitor circuits 11-14.

Two capacitors C1 and C2 having the same capacitance are connected in series between the first input end IN1 and the second input end IN2. Since the two capacitors C1 and C2 have the same capacitance, the voltage across each of the two capacitors C1 and C2 is equal to half (E/2) the DC power supply voltage E. Therefore, denoting the potential at the first input end IN1 by E [V] and the potential at the second input end IN2 by 0 [V], the potential at the node between the capacitor C1 and the capacitor C2 is E/2 [V]. As described above, the DC power supply voltage is divided by the two capacitors C1 and C2 in the power converter 10 shown in FIG. 1. In an alternative example, two resistors may divide the DC power supply voltage, or two DC power supplies each supplying E/2 [V] may be connected. The node between the first flying capacitor circuit 11 and the second flying capacitor circuit 12 and the node between the third flying capacitor circuit 13 and the fourth flying capacitor circuit 14 are connected to the midpoint of the DC power supply voltage divided by the two capacitors C1 and C2.

All of the first-fourth flying capacitor circuits 11-14 are three-level circuits of flying capacitor type, each being comprised of four switching elements connected in series and one flying capacitor. In an alternative example, three-level circuits other than the flying capacitor type may be used, or multi-level circuits outputting more than three levels may be used.

The first flying capacitor circuit 11 is comprised of four switching elements S5a, S5b, S5c, S5d and one flying capacitor FC1. Each of the four switching elements S5a-S5d is comprised of an N-channel MOSFET, and a body diode is connected between the source and the drain of each MOSFET. The four switching elements S5a-S5d are connected in series in the order S5a, S5b, S5c, S5d, the switching element S5a is connected to the first input end IN1, and the switching element S5d is connected to the node between the capacitor C1 and the capacitor C2. One end of the flying capacitor FC1 is connected to the node between the switching element S5a and the switching element S5b, and other end of the flying capacitor FC1 is connected to the node between the switching element S5c and the switching element S5d. Therefore, a potential in a range between the potential E [V] input from the switching element S5a and the potential E/2 [V] input from the switching element S5d is output from the output end provided at the node between the switching element S5b and the switching element S5c. The flying capacitor FC1 is precharged to a voltage E/4 [V] and is repeatedly charged and discharged around the voltage E/4 [V]. Therefore, three levels of potential (generally, E [V], 3E/4 [V], E/2 [V]) are output from the first flying capacitor circuit 11.

The second flying capacitor circuit 12 is comprised of four switching elements S6a, S6b, S6c, S6d and one flying capacitor FC2. Each of the four switching elements S6a-S6d is comprised of an N-channel MOSFET, and a body diode is connected between the source and the drain of each MOSFET. The four switching elements S6a-S6d are connected in series in the order S6a, S6b, S6c, S6d, the switching element S6a is connected to the node between the capacitor C1 and the capacitor C2, and the switching element S6d is connected to the second input end IN2. One end of the flying capacitor FC2 is connected to the node between the switching element S6a and the switching element S6b, and other end of the flying capacitor FC2 is connected to the node between the switching element S6c and the switching element S6d. Therefore, a potential in a range between the potential E/2 [V] input from the switching element S6a and the potential 0 [V] input from the switching element S6d is output from the output end provided at the node between the switching element S6b and the switching element S6c. The flying capacitor FC2 is precharged to a voltage E/4 [V] and is repeatedly charged and discharged around the voltage E/4 [V]. Therefore, three levels of potential (generally, E/2 [V], E/4 [V], 0 [V]) are output from the second flying capacitor circuit 12.

The third flying capacitor circuit 13 is comprised of four switching elements S7a, S7b, S7c, S7d and one flying capacitor FC3. Each of the four switching elements S7a-S7d is comprised of an N-channel MOSFET, and a body diode is connected between the source and the drain of each MOSFET. The four switching elements S7a-S7d are connected in series in the order S7a, S7b, S7c, S7d, the switching element S7a is connected to the first input end IN1, and the switching element S7d is connected to the node between the capacitor C1 and the capacitor C2. One end of the flying capacitor FC3 is connected to the node between the switching element S7a and the switching element S7b, and other end of the flying capacitor FC3 is connected to the node between the switching element S7c and the switching element S7d. Therefore, a potential in a range between the potential E [V] input from the switching element S7a and the potential E/2 [V] input from the switching element S7d is output from the output end provided at the node between the switching element S7b and the switching element S7c. The flying capacitor FC3 is precharged to a voltage E/4 [V] and is repeatedly charged and discharged around the voltage E/4 [V]. Therefore, three levels of potential (generally, E [V], 3E/4 [V], E/2 [V]) are output from the third flying capacitor circuit 13.

The fourth flying capacitor circuit 14 is comprised of four switching elements S8a, S8b, S8c, S8d and one flying capacitor FC4. Each of the four switching elements S8a-S8d is comprised of an N-channel MOSFET, and a body diode is connected between the source and the drain of each MOSFET. The four switching elements S8a-S8d are connected in series in the order S8a, S8b, S8c, S8d, the switching element S8a is connected to the node between the capacitor C1 and the capacitor C2, and the switching element S8d is connected to the second input end IN2. One end of the flying capacitor FC4 is connected to the node between the switching element S8a and the switching element S8b, and other end of the flying capacitor FC4 is connected to the node between the switching element S8c and the switching element S8d. Therefore, a potential in a range between the potential E/2 [V] input from the switching element S8a and the potential 0 [V] input from the switching element S8d is output from the output end provided at the node between the switching element S8b and the switching element S8c. The flying capacitor FC4 is precharged to a voltage E/4 [V] and is repeatedly charged and discharged around the voltage E/4 [V]. Therefore, three levels of potential (generally, E/2 [V], E/4 [V], 0 [V]) are output from the fourth flying capacitor circuit 14.

In the power converter 10 according to the embodiment, all of the four three-level circuits are comprised of flying capacitor three-level circuits. Therefore, all switching elements forming the four flying capacitor circuits 11-14 may have a withstand voltage E/4 [V]. This allows using switching elements having a low withstand voltage such as MOSFETs that are inexpensive and offer high performance. Therefore, it is possible to provide a power converter that is inexpensive and offers high performance. In an alternative example, some or all of the switching elements forming the four flying capacitor circuits 11-14 may be other switching elements such as insulated gate bipolar transistors (IGBT).

As described later, the method of controlling a power converter according to the embodiment controls the two flying capacitor circuits 11 and 12 so that a difference in output voltage between the two flying capacitor circuits 11 and 12 connected in series is equal to or smaller than E/2 [V]. The method also controls the two flying capacitor circuits 13 and 14 so that a difference in output voltage between the two flying capacitor circuits 13 and 14 connected in series is equal to or smaller than E/2 [V]. Therefore, switching elements having a withstand voltage E/2 [V] can be used as the switching elements S1-S4 in the output stage. Since switching elements having a low withstand voltage such as MOSFETs that are inexpensive and offer high performance can be used in the output stage as well, it is possible to provide a power converter that is inexpensive and offers high performance. The use of switching elements having a low withstand voltage can reduce the recovery current produced when switching the switching elements and so can inhibit a damage to elements caused by the recovery current.

Further, as described later, the method of controlling a power converter according to the embodiment controls the switching elements S1-S4 in the output stage to operate only when the polarity of the output voltage is switched. For this reason, the frequency of duty control of the switching elements S1-S4 is significantly lower than the frequency of duty control of the switching elements forming the four flying capacitor circuits 11-14. Therefore, a plurality of switching elements having a lower withstand voltage may be connected in series in replace of each the switching elements S1-S4. This is because, even if timing misalignment occurs when control signals input to the plurality of switching elements connected in series arise or fall, or, even if the timing is more or less misaligned when the plurality of switching elements are turned on/off due to a difference in the characteristics of the switching elements in the power converter 10 according to the embodiment, an abrupt rise in the voltage can be inhibited by, for example, a snubber circuit, and the circuitry is properly protected. In the switching pattern according to the second example of the control method described later, the switching elements S1-S4 can be switched at 0 voltage so that timing misalignment is further tolerated.

Figure 2:
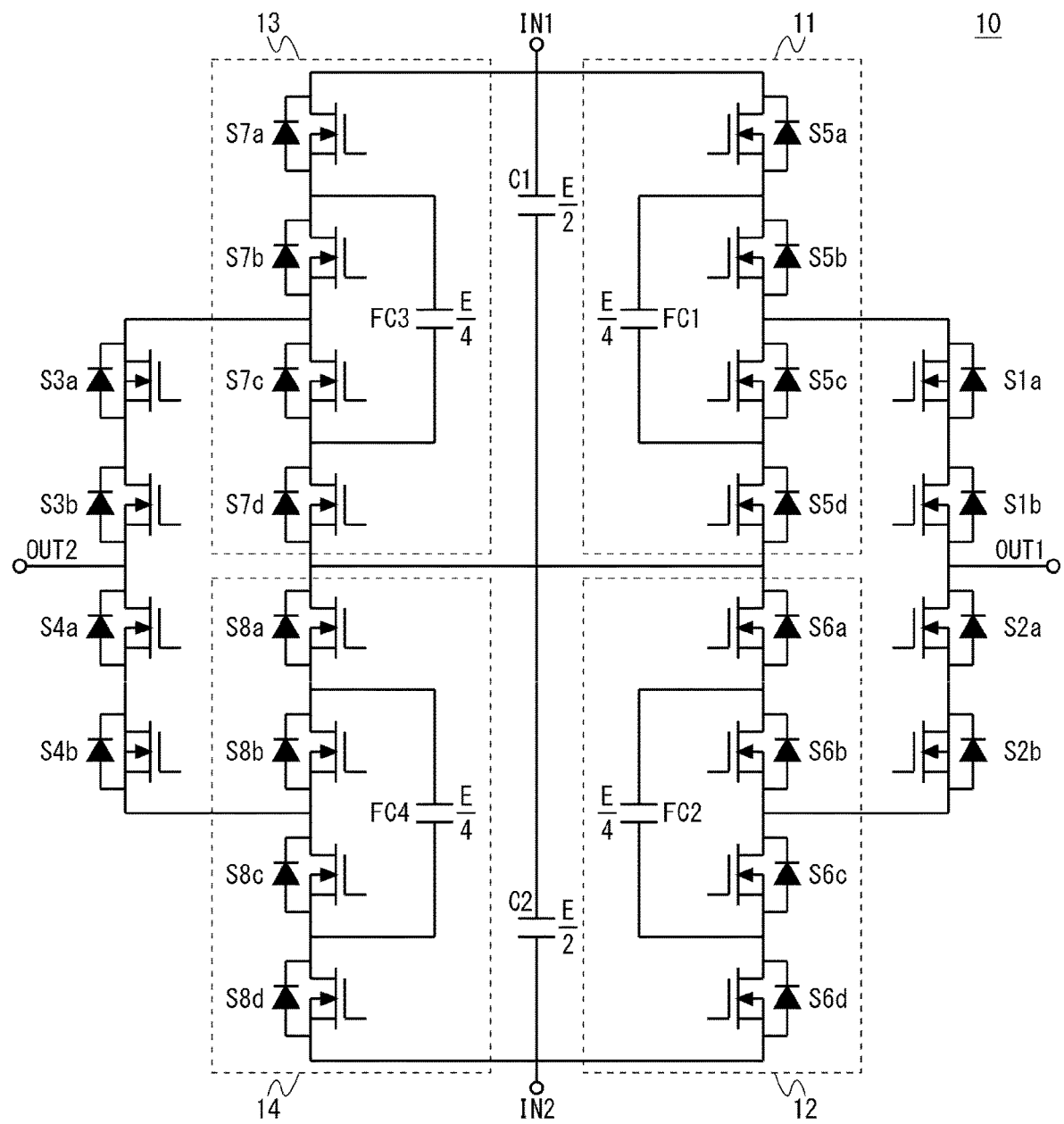
FIG. 2 is a circuit diagram of a power converter according to a second embodiment of the present disclosure.

FIG. 2 is a circuit diagram of a power converter according to a second embodiment of the present disclosure. In the power converter 10 shown in FIG. 2, each of the switching elements S1-S4 in the output stage of the power converter 10 shown in FIG. 1 is replaced by two switching elements connected in series. The other features are the same as those of FIG. 1.

According to this configuration, the withstand voltage of the switching elements in the output stage can be further reduced to half that of the power converter 10 shown in FIG. 1. Therefore, the switching elements S1a-S4b in the output stage may all have a withstand voltage E/4. Therefore, all of the switching elements forming the power converter 10 shown in FIG. 2 can be a switching element having a withstand voltage E/4 [V]. If the DC power supply voltage is 600 [V], for example, all of the switching elements may be switching elements having a withstand voltage 150 [V] that are less expensive and offer high performance so that it is possible to provide a power converter that is less expensive and offers higher performance.

A description will now be given of a method of controlling a power converter according to the embodiment of the present disclosure, using the circuit of the power converter shown in FIG. 2. It is given that all of the switching elements forming the power converter 10 shown in FIG. 2 are MOSFETs, and a gate signal is supplied from a control circuit (not shown) to the gate terminal of each of the switching elements for on/off control.

FIGS. 3A-3D show a first example of switching pattern in the method of controlling a power converter according to the embodiment and show switching patterns in which an output voltage having the positive polarity in the U phase and the negative polarity in the W phase is output. In FIG. 3, the switching elements are illustrated in a simplified fashion for ease of understanding.

Figure 3A:
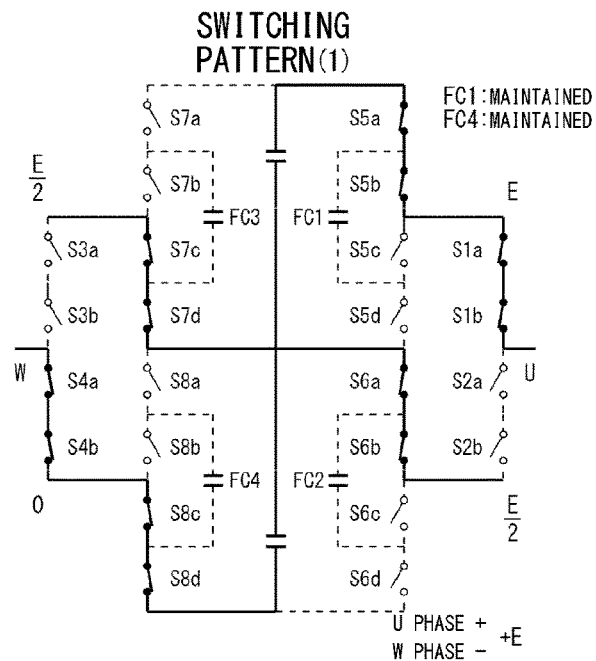
FIGS. 3A-3D show a first example of switching pattern in the method of controlling a power converter according to the embodiment and show switching patterns in which an output voltage having the positive polarity in the U phase and the negative polarity in the W phase is output.

FIG. 3A shows a switching pattern (1) for outputting a +E [V] output voltage. In the switching pattern (1), the switching elements S5a and S5b of the first flying capacitor circuit 11 are turned on, and S5c and S5d are turned off to output E [V] from the first flying capacitor circuit 11. The switching elements S1a and S1b in the output stage are turned on, and S2a and S2b are turned off to output, from the first output end OUT1, E [V] output from the first flying capacitor circuit 11. Further, the switching elements S8c and S8d of the fourth flying capacitor circuit 14 are turned on, and S8a and S8b are turned off to output 0 [V] from the fourth flying capacitor circuit 14. The switching elements S4a and S4b in the output stage are turned on, and S3a and S3b are turned off to output, from the second output end OUT2, 0 [V] output from the fourth flying capacitor circuit 14. This causes +E [V] to be output from the first output end OUT1 and the second output end OUT2.

In this process, by controlling the second flying capacitor circuit 12 connected in series with the first flying capacitor circuit 11 in coordination with the first flying capacitor circuit 11 and according to the same switching patter, it is ensured that the difference between the potential output from the first flying capacitor circuit 11 and the potential output from the second flying capacitor circuit 12 is E/2 [V]. Specifically, when the switching elements S6a and S6b of the second flying capacitor circuit 12 are turned on, and S6c and S6d are turned off to output E/2 [V] from the second flying capacitor circuit 12, the difference between the potential E [V] output from the first flying capacitor circuit 11 and the potential E/2 [V] output from the second flying capacitor circuit 12 is E/2 [V].

Similarly, by controlling the third flying capacitor circuit 13 connected in series with the fourth flying capacitor circuit 14 in coordination with the fourth flying capacitor circuit 14 and according to the same switching patter, it is ensured that the difference between the potential output from the third flying capacitor circuit 13 and the potential output from the fourth flying capacitor circuit 14 is E/2 [V]. Specifically, when the switching elements S7c and S7d of the third flying capacitor circuit 13 are turned on, and S7a and S7b are turned off to output E/2 [V] from the third flying capacitor circuit 13, the difference between the potential E/2 [V] output from the third flying capacitor circuit 13 and the potential 0 [V] output from the fourth flying capacitor circuit 14 is E/2 [V].

In the switching pattern (1), the four flying capacitors FC1-FC4 are neither charged nor discharged, and the charge is maintained.

Figure 3B:
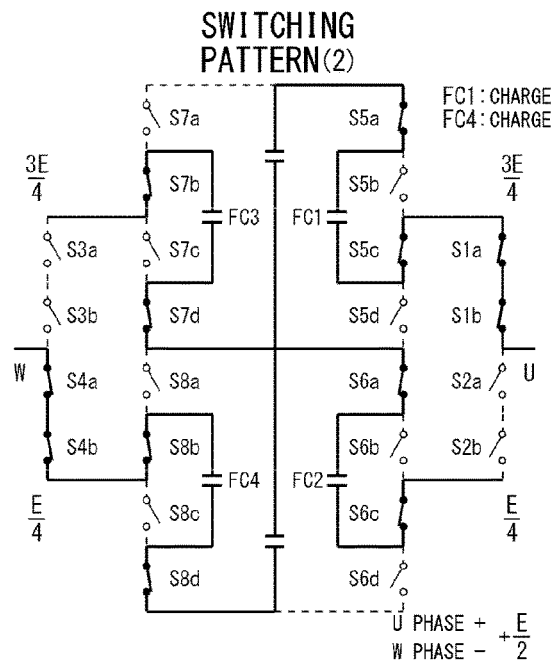

FIG. 3B shows a switching pattern (2) for outputting a +E/2 [V] output voltage. In the switching pattern (2), the switching elements S5a and S5c of the first flying capacitor circuit 11 are turned on, and S5b and S5d are turned off to output 3E/4 [V] from the first flying capacitor circuit 11. The switching elements S1a and S1b in the output stage are turned on, and S2a and S2b are turned off to output, from the first output end OUT1, 3E/4 [V] output from the first flying capacitor circuit 11. Further, the switching elements S8b and S8d of the fourth flying capacitor circuit 14 are turned on, and S8a and S8c are turned off to output E/4 [V] from the fourth flying capacitor circuit 14. The switching elements S4a and S4b in the output stage are turned on, and S3a and S3b are turned off to output, from the second output end OUT2, E/4 [V] output from the fourth flying capacitor circuit 14. This causes +E/2 [V] to be output from the first output end OUT1 and the second output end OUT2.

In this process, when the switching elements S6a and S6c of the second flying capacitor circuit 12 are turned on, and S6b and S6d are turned off to output E/4 [V] from the second flying capacitor circuit 12, the difference between the potential 3E/4 [V] output from the first flying capacitor circuit 11 and the potential E/4 [V] output from the second flying capacitor circuit 12 is E/2 [V].

Similarly, when the switching elements S7b and S7d of the third flying capacitor circuit 13 are turned on, and S7a and S7c are turned off to output 3E/4 [V] from the third flying capacitor circuit 13, the difference between the potential 3E/4 [V] output from the third flying capacitor circuit 13 and the potential E/4 [V] output from the fourth flying capacitor circuit 14 is E/2 [V].

In the switching pattern (2), the flying capacitors FC1 and FC4 are charged, and the flying capacitors FC2 and FC3 are neither charged nor discharged.

Figure 3C:
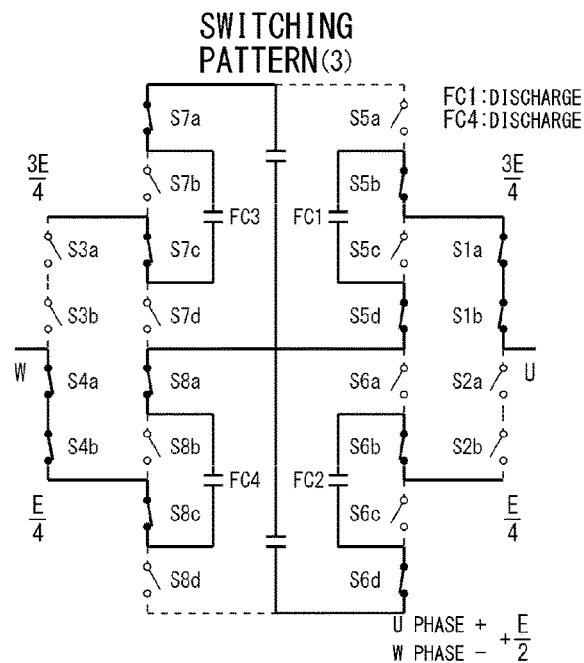

FIG. 3C shows a switching pattern (3) for outputting a +E/2 [V] output voltage. In the switching pattern (3), the switching elements S5b and S5d of the first flying capacitor circuit 11 are turned on, and S5a and S5c are turned off to output 3E/4 [V] from the first flying capacitor circuit 11. The switching elements S1a and S1b in the output stage are turned on, and S2a and S2b are turned off to output, from the first output end OUT1, 3E/4 [V] output from the first flying capacitor circuit 11. Further, the switching elements S8a and S8c of the fourth flying capacitor circuit 14 are turned on, and S8b and S8d are turned off to output E/4 [V] from the fourth flying capacitor circuit 14. The switching elements S4a and S4b in the output stage are turned on, and S3a and S3b are turned off to output, from the second output end OUT2, E/4 [V] output from the fourth flying capacitor circuit 14. This causes +E/2 [V] to be output from the first output end OUT1 and the second output end OUT2.

In this process, when the switching elements S6b and S6d of the second flying capacitor circuit 12 are turned on, and S6a and S6c are turned off to output E/4 [V] from the second flying capacitor circuit 12, the difference between the potential 3E/4 [V] output from the first flying capacitor circuit 11 and the potential E/4 [V] output from the second flying capacitor circuit 12 is E/2 [V].

Similarly, when the switching elements S7a and S7c of the third flying capacitor circuit 13 are turned on, and S7b and S7d are turned off to output 3E/4 [V] from the third flying capacitor circuit 13, the difference between the potential 3E/4 [V] output from the third flying capacitor circuit 13 and the potential E/4 [V] output from the fourth flying capacitor circuit 14 is E/2 [V].

In the switching pattern (3), the flying capacitors FC1 and FC4 are discharged, and the flying capacitors FC2 and FC3 are neither charged nor discharged.

Figure 3D:
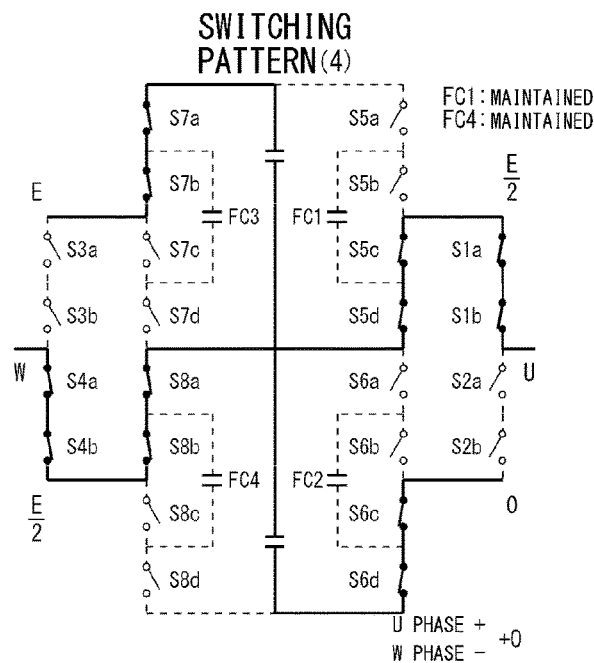

FIG. 3D shows a switching pattern (4) for outputting a 0 [V] output voltage. In the switching pattern (4), the switching elements S5c and S5d of the first flying capacitor circuit 11 are turned on, and S5a and S5b are turned off to output E/2 [V] from the first flying capacitor circuit 11. The switching elements S1a and S1b in the output stage are turned on, and S2a and S2b are turned off to output, from the first output end OUT1, E/2 [V] output from the first flying capacitor circuit 11. Further, the switching elements S8a and S8b of the fourth flying capacitor circuit 14 are turned on, and S8c and S8d are turned off to output E/2 [V] from the fourth flying capacitor circuit 14. The switching elements S4a and S4b in the output stage are turned on, and S3a and S3b are turned off to output, from the second output end OUT2, E/2 [V] output from the fourth flying capacitor circuit 14. This causes +0 [V] to be output from the first output end OUT1 and the second output end OUT2.

In this process, when the switching elements S6c and S6d of the second flying capacitor circuit 12 are turned on, and S6a and S6b are turned off to output 0 [V] from the second flying capacitor circuit 12, the difference between the potential E/2 [V] output from the first flying capacitor circuit 11 and the potential 0 [V] output from the second flying capacitor circuit 12 is E/2 [V].

Similarly, when the switching elements S7a and S7b of the third flying capacitor circuit 13 are turned on, and S7c and S7d are turned off to output E/[V] from the third flying capacitor circuit 13, the difference between the potential E [V] output from the third flying capacitor circuit 13 and the potential E/2 [V] output from the fourth flying capacitor circuit 14 is E/2 [V].

In the switching pattern (4), the four flying capacitors FC1-FC4 are neither charged nor discharged, and the charge is maintained.

FIGS. 4A-4D show a first example of switching pattern in the method of controlling a power converter according to the embodiment and show switching patterns in which an output voltage having the negative polarity in the U phase and the positive polarity in the W phase is output. In FIG. 4, too, the switching elements are illustrated in a simplified fashion for ease of understanding.

Figure 4A:
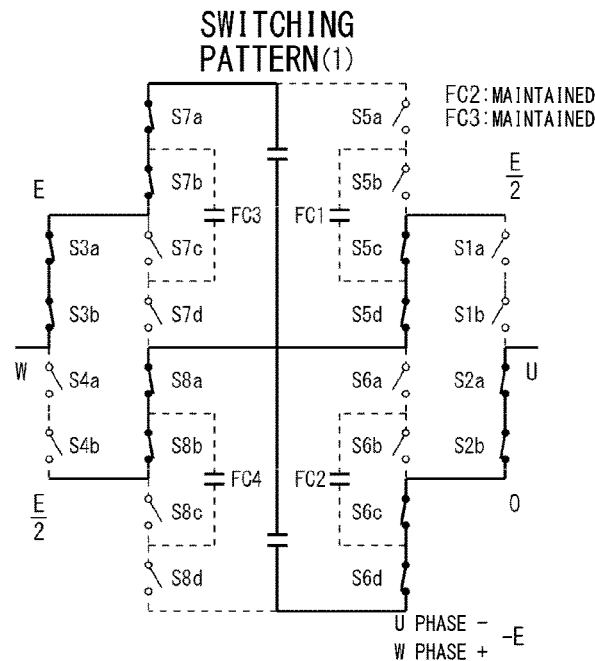
FIGS. 4A-4D show a first example of switching pattern in the method of controlling a power converter according to the embodiment and show switching patterns in which an output voltage having the negative polarity in the U phase and the positive polarity in the W phase is output.

FIG. 4A shows a switching pattern (1) for outputting a −E [V] output voltage. In the switching pattern (1), the switching elements S6c and S6d of the second flying capacitor circuit 12 are turned on, and S6a and S6b are turned off to output 0 [V] from the second flying capacitor circuit 12. The switching elements S2a and S2b in the output stage are turned on, and S1a and S1b are turned off to output, from the first output end OUT1, 0 [V] output from the second flying capacitor circuit 12. Further, the switching elements S7a and S7b of the third flying capacitor circuit 13 are turned on, and S7c and S7d are turned off to output E [V] from the third flying capacitor circuit 13. The switching elements S3a and S3b in the output stage are turned on, and S4a and S4b are turned off to output, from the second output end OUT2, E [V] output from the third flying capacitor circuit 13. This causes −E [V] to be output from the first output end OUT1 and the second output end OUT2.

In this process, when the switching elements S5c and S5d of the first flying capacitor circuit 11 are turned on, and S5a and S5b are turned off to output E/2 [V] from the first flying capacitor circuit 11, the difference between the potential E/2 [V] output from the first flying capacitor circuit 11 and the potential 0 [V] output from the second flying capacitor circuit 12 is E/2 [V].

Similarly, when the switching elements S8a and S8b of the fourth flying capacitor circuit 14 are turned on, and S8c and S8d are turned off to output E/2 [V] from the fourth flying capacitor circuit 14, the difference between the potential E [V] output from the third flying capacitor circuit 13 and the potential E/2 [V] output from the fourth flying capacitor circuit 14 is E/2 [V].

In the switching pattern (1), the four flying capacitors FC1-FC4 are neither charged nor discharged, and the charge is maintained.

Figure 4B:
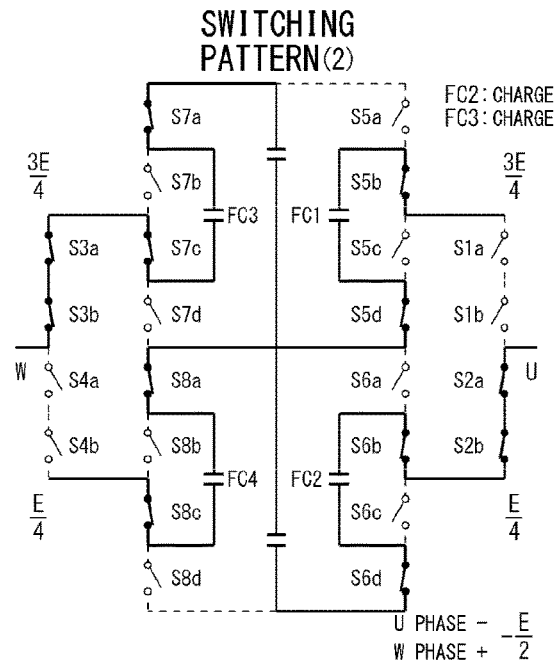

FIG. 4B shows a switching pattern (2) for outputting a −E/2 [V] output voltage. In the switching pattern (2), the switching elements S6b and S6d of the second flying capacitor circuit 12 are turned on, and S6a and S6c are turned off to output E/4 [V] from the second flying capacitor circuit 12. The switching elements S2a and S2b in the output stage are turned on, and S1a and S1b are turned off to output, from the first output end OUT1, E/4 [V] output from the second flying capacitor circuit 12. Further, the switching elements S7a and S7c of the third flying capacitor circuit 13 are turned on, and S7b and S7d are turned off to output 3E/4 [V] from the third flying capacitor circuit 13. The switching elements S3a and S3b in the output stage are turned on, and S4a and S4b are turned off to output, from the second output end OUT2, 3E/4 [V] output from the third flying capacitor circuit 13. This causes −E/2 [V] to be output from the first output end OUT1 and the second output end OUT2.

In this process, when the switching elements S5b and S5d of the first flying capacitor circuit 11 are turned on, and S5a and S5c are turned off to output 3E/4 [V] from the first flying capacitor circuit 11, the difference between the potential 3E/4 [V] output from the first flying capacitor circuit 11 and the potential E/4 [V] output from the second flying capacitor circuit 12 is E/2 [V].

Similarly, when the switching elements S8a and S8c of the fourth flying capacitor circuit 14 are turned on, and S8b and S8d are turned off to output E/4 [V] from the fourth flying capacitor circuit 14, the difference between the potential 3E/4 [V] output from the third flying capacitor circuit 13 and the potential E/4 [V] output from the fourth flying capacitor circuit 14 is E/2 [V].

In the switching pattern (2), the flying capacitors FC2 and FC3 are charged, and the flying capacitors FC1 and FC4 are neither charged nor discharged.

Figure 4C:
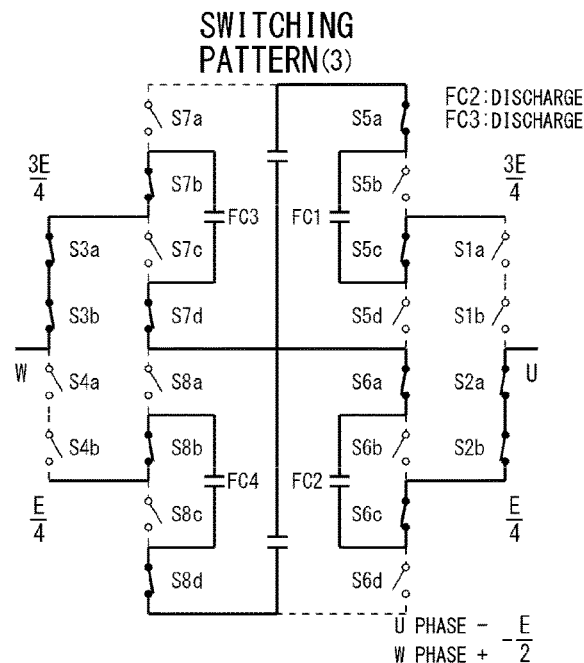

FIG. 4C shows a switching pattern (3) for outputting a −E/2 [V] output voltage. In the switching pattern (3), the switching elements S6a and S6c of the second flying capacitor circuit 12 are turned on, and S6b and S6d are turned off to output E/4 [V] from the second flying capacitor circuit 12. The switching elements S2a and S2b in the output stage are turned on, and S1a and S1b are turned off to output, from the first output end OUT1, E/4 [V] output from the second flying capacitor circuit 12. Further, the switching elements S7b and S7d of the third flying capacitor circuit 13 are turned on, and S7a and S7c are turned off to output 3E/4 [V] from the third flying capacitor circuit 13. The switching elements S3a and S3b in the output stage are turned on, and S4a and S4b are turned off to output, from the second output end OUT2, 3E/4 [V] output from the third flying capacitor circuit 13. This causes −E/2 [V] to be output from the first output end OUT1 and the second output end OUT2.

In this process, when the switching elements S5a and S5c of the first flying capacitor circuit 11 are turned on, and S5b and S5d are turned off to output 3E/4 [V] from the first flying capacitor circuit 11, the difference between the potential 3E/4 [V] output from the first flying capacitor circuit 11 and the potential E/4 [V] output from the second flying capacitor circuit 12 is E/2 [V].

Similarly, when the switching elements S8b and S8d of the fourth flying capacitor circuit 14 are turned on, and S8a and S8c are turned off to output E/4 [V] from the fourth flying capacitor circuit 14, the difference between the potential 3E/4 [V] output from the third flying capacitor circuit 13 and the potential E/4 [V] output from the fourth flying capacitor circuit 14 is E/2 [V].

In the switching pattern (3), the flying capacitors FC2 and FC3 are discharged, and the flying capacitors FC1 and FC4 are neither charged nor discharged.

Figure 4D:
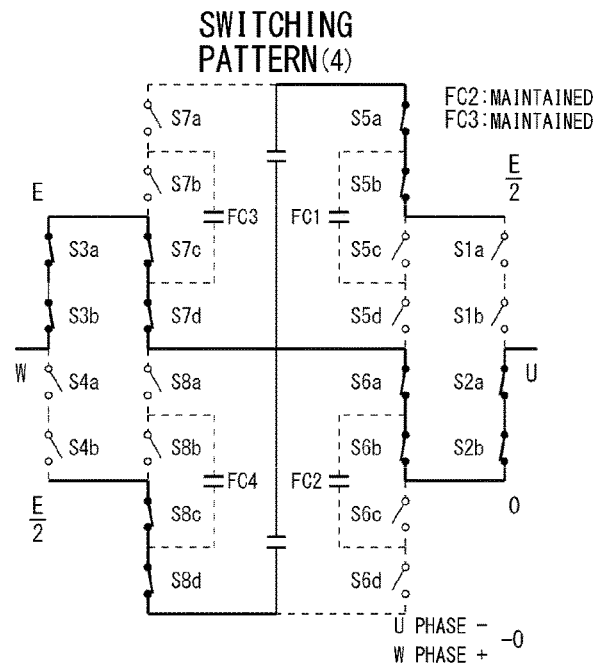
Figure 5A:
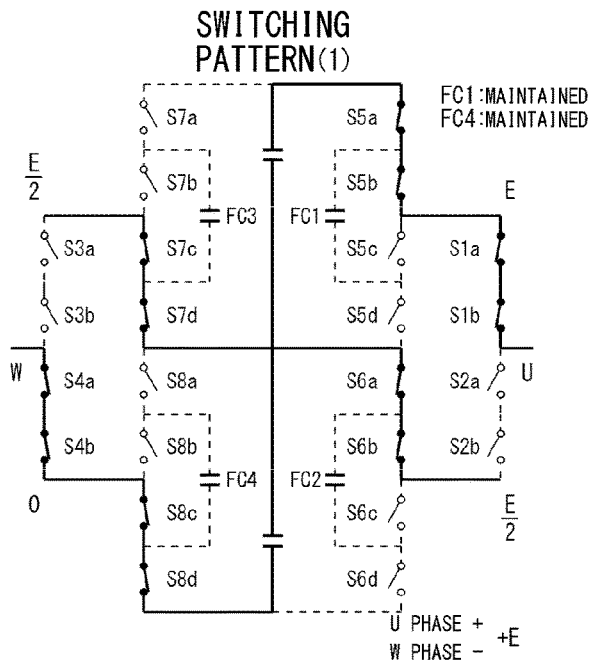
FIGS. 5A-5D show a second example of switching pattern in the method of controlling a power converter according to the embodiment and show switching patterns in which an output voltage having the positive polarity in the U phase and the negative polarity in the W phase is output.
Figure 5B:
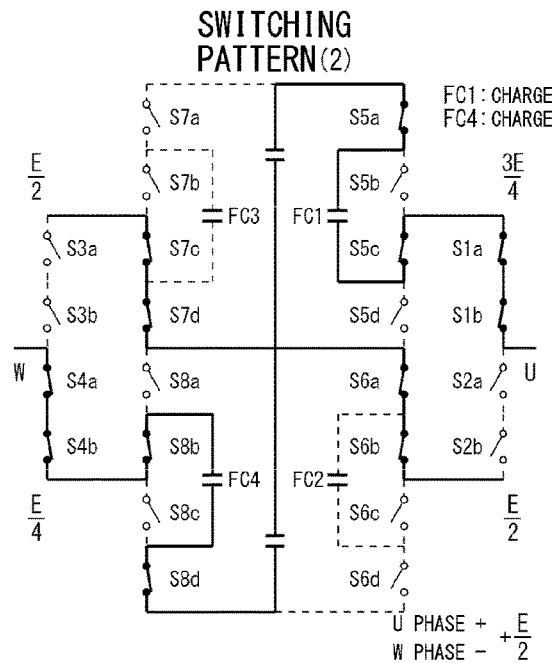
Figure 5C:
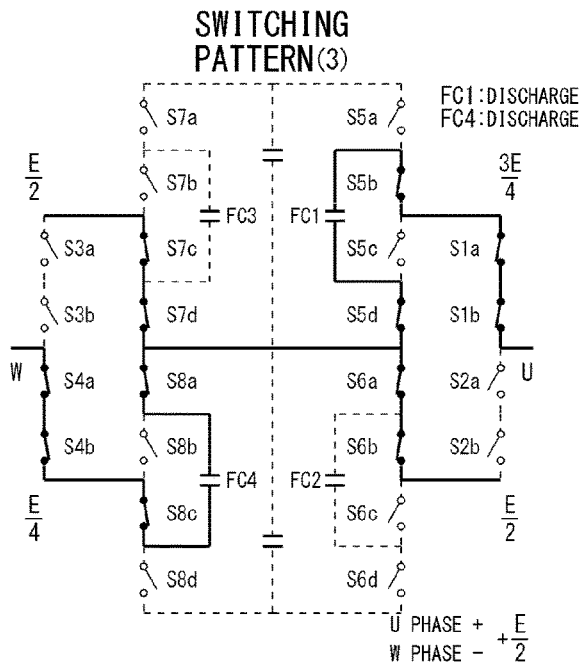
Figure 5D:
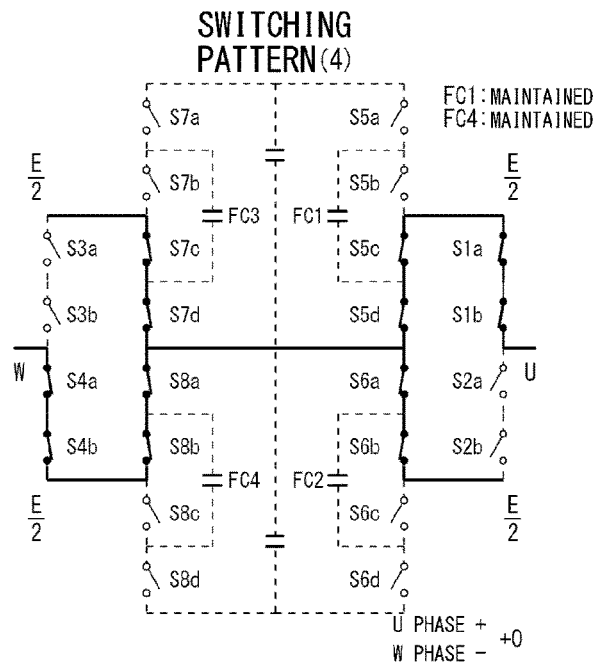
Figure 6A:
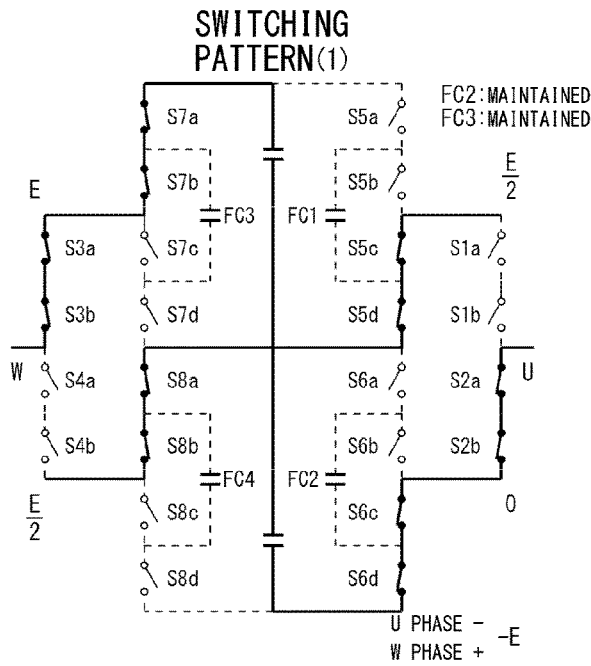
FIGS. 6A-6D show a second example of switching pattern in the method of controlling a power converter according to the embodiment and show switching patterns in which an output voltage having the negative polarity in the U phase and the positive polarity in the W phase is output.
Figure 6B:
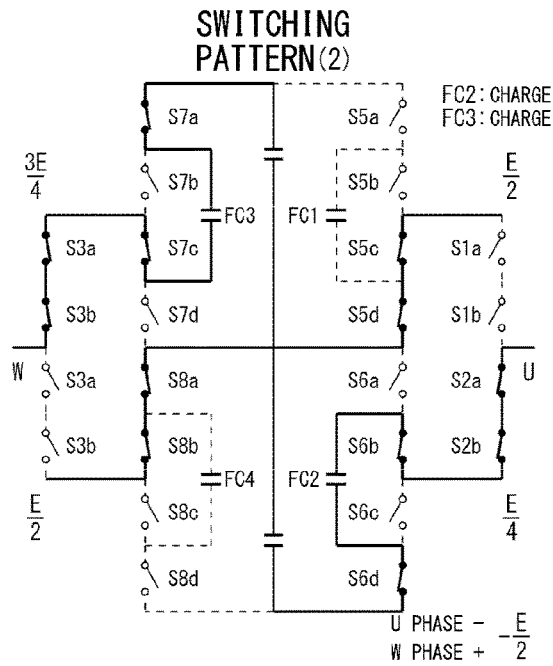
Figure 6C:
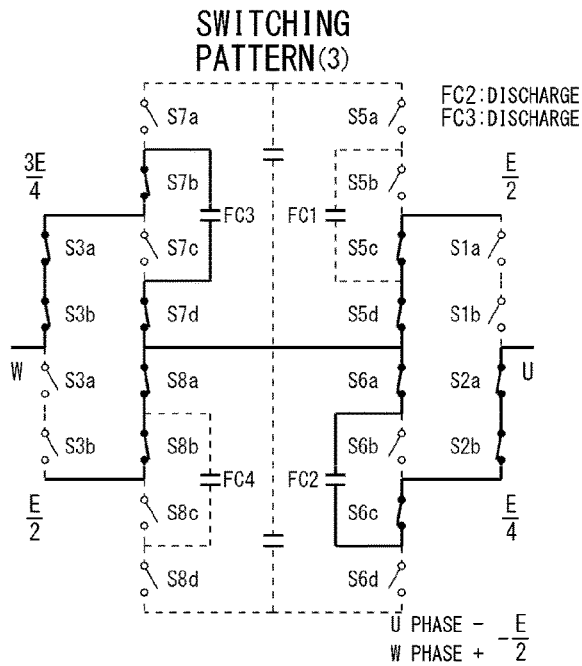
Figure 6D:
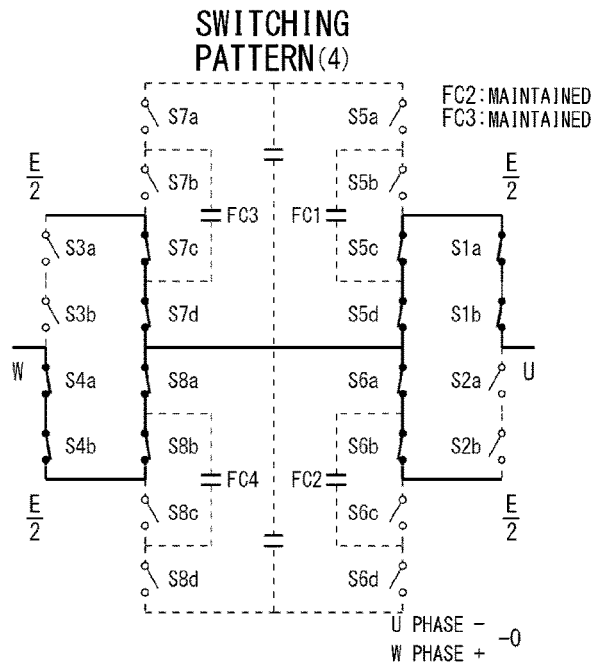

FIG. 4D shows a switching pattern (4) for outputting a −0 [V] output voltage. In the switching pattern (4), the switching elements S6a and S6b of the second flying capacitor circuit 12 are turned on, and S6c and S6d are turned off to output E/2 [V] from the second flying capacitor circuit 12. The switching elements S2a and S2b in the output stage are turned on, and S1a and S1b are turned off to output, from the first output end OUT1, E/2 [V] output from the second flying capacitor circuit 12. Further, the switching elements S7c and S7d of the third flying capacitor circuit 13 are turned on, and S7a and S7b are turned off to output E/2 [V] from the third flying capacitor circuit 13. The switching elements S3a and S3b in the output stage are turned on, and S4a and S4b are turned off to output, from the second output end OUT2, E/2 [V] output from the third flying capacitor circuit 13. This causes −0 [V] to be output from the first output end OUT1 and the second output end OUT2.

In this process, when the switching elements S5a and S5b of the first flying capacitor circuit 11 are turned on, and S5c and S5d are turned off to output E [V] from the first flying capacitor circuit 11, the difference between the potential E [V] output from the first flying capacitor circuit 11 and the potential E/2 [V] output from the second flying capacitor circuit 12 is E/2 [V].

Similarly, when the switching elements S8c and S8d of the fourth flying capacitor circuit 14 are turned on, and S8a and S8b are turned off to output 0 [V] from the fourth flying capacitor circuit 14, the difference between the potential E/2 [V] output from the third flying capacitor circuit 13 and the potential 0 [V] output from the fourth flying capacitor circuit 14 is E/2 [V].

In the switching pattern (4), the four flying capacitors FC1-FC4 are neither charged nor discharged, and the charge is maintained.

As described above, the power converter 10 according to the embodiment can output voltage in five steps −E, −E/2, 0, +E/2, +E. In all of the switching patterns in the first example, the difference between the output voltage of the first flying capacitor circuit 11 and the output voltage of the second flying capacitor circuit 12 is E/2 [V] or smaller, and the difference between the output voltage of the third flying capacitor circuit 13 and the output voltage of the fourth flying capacitor circuit 14 is also E/2 [V] or smaller. Further, as shown in FIG. 3, the switching elements S1a, S1b, S4a, S4b in the output stage are turned on, and S2a, S2b, S3a, S3b are turned off while an output voltage having the positive polarity in the U phase and the negative polarity in the W phase is being output to generate a half wave of the AC power. Further, as shown in FIG. 4, the switching elements S2a, S2b, S3a, S3b in the output stage are turned on, and S1a, S1b, S4a, S4b are turned off while an output voltage having the negative polarity in the U phase and the positive polarity in the W phase is being output to generate a half wave of the AC power of the opposite polarity. In this way, the switching elements in the output stage are switched on or off only when the polarity of the output voltage of the power converter 10 is switched.

FIGS. 5A-5D show a second example of switching pattern in the method of controlling a power converter according to the embodiment and show switching patterns in which an output voltage having the positive polarity in the U phase and the negative polarity in the W phase is output. Referring to the switching patterns (1)-(4) shown in FIGS. 5A-5D, the switching patterns of the switching elements forming the first flying capacitor circuit 11 and the fourth flying capacitor circuit 14 and of the switching elements in the output stage are the same as the switching patterns (1)-(4) in the first example shown in FIGS. 3A-3D, respectively. Therefore, the voltages output from the first output end OUT1 and the second output end OUT2 and the charge and discharge states of the flying capacitors FC1 and FC4 are also the same as those of the switching patterns (1)-(4) in the first example shown in FIGS. 3A-3D.

In the switching patterns (1)-(4) shown in FIGS. 5A-5D, the switching pattern of the switching elements forming the second flying capacitor circuit 12 and the third flying capacitor circuit 13 remains unchanged, the switching elements S6a, S6b, S7c, and S7d remaining turned on, and the switching elements S6c, S6d, S7a, and S7b remaining turned off. Therefore, the output voltage of the second flying capacitor circuit 12 and the output voltage of the third flying capacitor circuit 13 continue to be E/2 [V].

It follows that the difference between the output voltage of the first flying capacitor circuit 11 and the output voltage of the second flying capacitor circuit 12 is E/2 [V] in the switching pattern (1), E/4 [V] in the switching patterns (2) and (3), and 0 [V] in the switching pattern (4). Further, the difference between the output voltage of the third flying capacitor circuit 13 and the output voltage of the fourth flying capacitor circuit 14 is also E/2 [V] in the switching pattern (1), E/4 [V] in the switching patterns (2) and (3), and 0 [V] in the switching pattern (4). Therefore, the second example can also control the difference between the output voltage of the first flying capacitor circuit 11 and the output voltage of the second flying capacitor circuit 12 and the difference between the output voltage of the third flying capacitor circuit 13 and the output voltage of the fourth flying capacitor circuit 14 to be E/2 [V] or smaller.

FIGS. 6A-6D show a second example of switching pattern in the method of controlling a power converter according to the embodiment and show switching patterns in which an output voltage having the negative polarity in the U phase and the positive polarity in the W phase is output. Referring to the switching patterns (1)-(4) shown in FIGS. 6A-6D, the switching patterns of the switching elements forming the second flying capacitor circuit 12 and the third flying capacitor circuit 13 and of the switching elements in the output stage are the same as the switching patterns (1)-(4) in the first example shown in FIGS. 4A-4D, respectively. Therefore, the voltages output from the first output end OUT1 and the second output end OUT2 and the charge and discharge states of the flying capacitors FC2 and FC3 are also the same as those of the switching patterns (1)-(4) in the first example shown in FIGS. 4A-4D.

In the switching patterns (1)-(4) shown in FIGS. 6A-6D, the switching pattern of the switching elements forming the first flying capacitor circuit 11 and the fourth flying capacitor circuit 14 remains unchanged, the switching elements S5c, S5d, S8a, and S8b remaining turned on, and the switching elements S5a, S5b, S8c, and S8d remaining turned off. Therefore, the output voltage of the first flying capacitor circuit 11 and the output voltage of the fourth flying capacitor circuit 14 continue to be E/2 [V].

It follows that the difference between the output voltage of the first flying capacitor circuit 11 and the output voltage of the second flying capacitor circuit 12 is E/2 [V] in the switching pattern (1), E/4 [V] in the switching patterns (2) and (3), and 0 [V] in the switching pattern (4). Further, the difference between the output voltage of the third flying capacitor circuit 13 and the output voltage of the fourth flying capacitor circuit 14 is also E/2 [V] in the switching pattern (1), E/4 [V] in the switching patterns (2) and (3), and 0 [V] in the switching pattern (4). Therefore, the second example can also control the difference between the output voltage of the first flying capacitor circuit 11 and the output voltage of the second flying capacitor circuit 12 and the difference between the output voltage of the third flying capacitor circuit 13 and the output voltage of the fourth flying capacitor circuit 14 to be E/2 [V] or smaller.

In the second example, both the difference between the output voltage of the first flying capacitor circuit 11 and the output voltage of the second flying capacitor circuit 12 and the difference between the output voltage of the third flying capacitor circuit 13 and the output voltage of the fourth flying capacitor circuit 14 are 0 [V] when the polarity of the output voltage is switched, i.e., in the case of the switching pattern (4). Accordingly, the switching elements in the output stage are controlled in zero-voltage switching (ZVS) so that the loss and load produced at the time of switching are reduced.

The method of controlling a power converter according to the embodiment makes it possible to output the same voltage +E/2 [V] in different switching patterns (2) and (3), as shown in FIG. 3B and FIG. 3C, FIG. 5B and FIG. 5C. The flying capacitors FC1 and FC4 are charged in the switching pattern (2), and the flying capacitors FC1 and FC4 are discharged in the switching pattern (3). Therefore, the voltages across the flying capacitors FC1 and FC4 can be maintained constant by controlling the duty ratio of the switching pattern (2) and the switching pattern (3) for outputting the +E/2 [V] output voltage. Similarly, the same voltage −E/2 [V] is output in different switching patterns (2) and (3), as shown in FIG. 4B and FIG. 4C, FIG. 6B and FIG. 6C. The flying capacitors FC2 and FC3 are charged in the switching pattern (2), and the flying capacitors FC2 and FC3 are discharged in the switching pattern (3). Therefore, the voltages across the flying capacitors FC2 and FC3 can be maintained constant by controlling the duty ratio of the switching pattern (2) and the switching pattern (3) for outputting the −E/2 [V] output voltage. This makes it possible to control the output voltage of the power converter 10 more precisely and efficiently.

In the switching patterns shown in FIGS. 3B, 3C, 4B, 4C, 5B, 5C, 6B, and 6C, both of the two flying capacitors are charged or discharged. Alternatively, one may be controlled to be charged, while the other is controlled to be discharged.

Figure 7A:
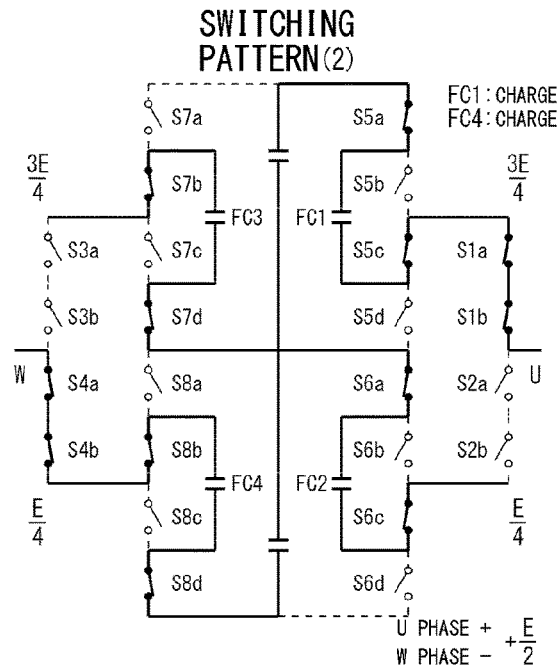
FIGS. 7A-7D show an alternative to the switching pattern (2) shown in FIG. 3B and an alternative to the switching pattern (3) shown in FIG. 3C.
Figure 7B:
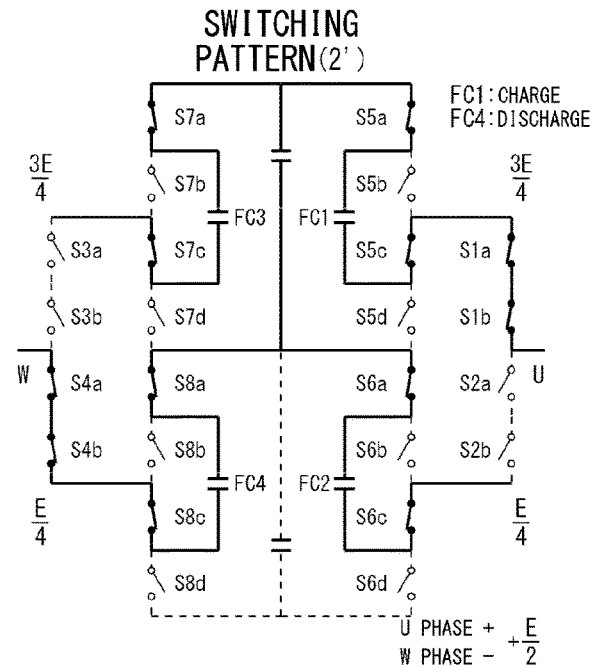
Figure 7C:
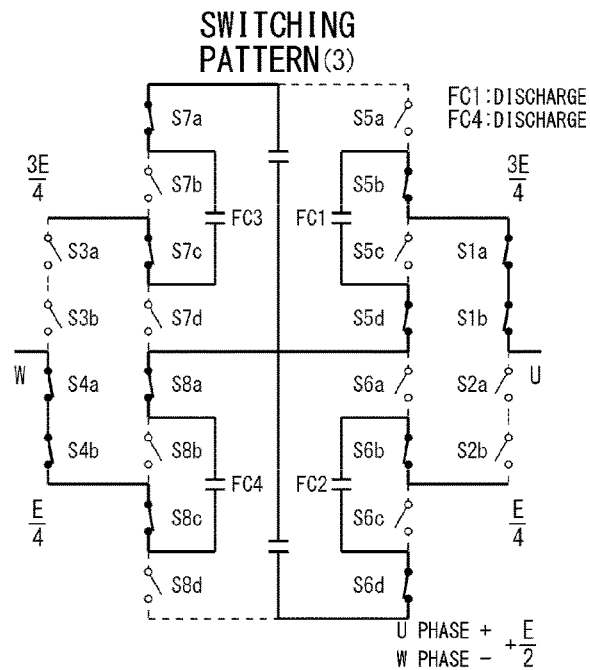
Figure 7D:
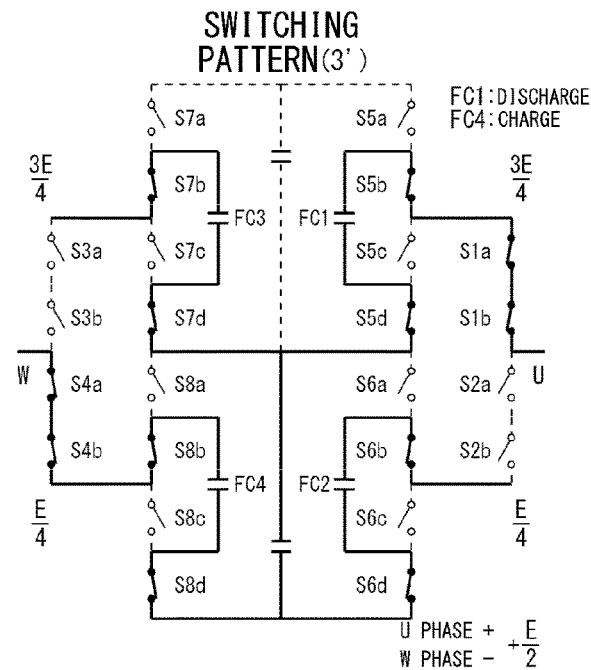

FIGS. 7A-7D show an alternative to the switching pattern (2) shown in FIG. 3B and an alternative to the switching pattern (3) shown in FIG. 3C. The switching pattern shown in FIG. 7A is the same as the switching pattern (2) shown in FIG. 3B, and the switching pattern shown in FIG. 7C is the same as the switching pattern (3) shown in FIG. 3C, but they are shown again for the purpose of comparison. In the switching pattern (2') shown in FIG. 7B, the switching pattern of the switching elements forming the two flying capacitor circuits 11 and 12 on the U phase side is identical to the switching pattern (2). The switching pattern of the switching elements forming the two flying capacitor circuits 13 and 14 on the W phase side is identical to the switching pattern (3). Therefore, the flying capacitor FC1 is charged, and the flying capacitor FC4 is discharged. In the switching pattern (3') shown in FIG. 7D, the switching pattern of the switching elements forming the two flying capacitor circuits 11 and 12 on the U phase side is identical to the switching pattern (3). The switching pattern of the switching elements forming the two flying capacitor circuits 13 and 14 on the W phase side is identical to the switching pattern (2). Therefore, the flying capacitor FC1 is discharged, and the flying capacitor FC4 is charged. The same is true of the switching pattern (2) shown in FIG. 4B, FIG. 5B, and FIG. 6B and the switching pattern (3) shown in FIG. 4C, FIG. 5C, and FIG. 6C.

In the case only the switching patterns (2) and (3) are used and the switching patterns (2') and (3') are not used in the first example of switching pattern of the method of controlling the power converter 10 according to the embodiment, the switching patterns of the switching elements forming the two flying capacitor circuits connected in series are coordinated with each other in all of the switching patterns shown in FIGS. 3A-3D and FIGS. 4A-4D, and the switching pattern of the switching elements forming the two flying capacitor circuits and the switching pattern of the switching elements in the opposite arm that is connected in parallel are inversed. In other words, the first flying capacitor circuit 11 and the second flying capacitor circuit 12 are controlled in coordination, and the third flying capacitor circuit 13 and the fourth flying capacitor circuit 14 are also controlled in coordination. The first and second flying capacitor circuits 11, 12 and the third and fourth flying capacitor circuits 13, 14 are controlled inversely. Further, the switching elements S1a, S1b and the switching elements S4a, S4b are controlled in coordination, and the switching elements S2a, S2b and the switching elements S3a, S3b are also controlled in coordination, The switching elements S1a, S1b, S4a, and S4b and the switching elements S2a, S2b, S3a, and S3b are controlled inversely. Therefore, the control lines for supplying gate signals from the control circuit to the gate terminals of the respective switching elements forming the power converter 10 may be comprised of four lines for controlling the switching elements forming the flying capacitor circuits 11-14 and two lines for controlling the polarity of the output voltage by means of the switching elements in the output stage. Inverted versions of the control signals supplied to the switching elements forming the first flying capacitor circuit 11 and the second flying capacitor circuit 12 are supplied to the switching elements forming the third flying capacitor circuit 13 and the fourth flying capacitor circuit 14. Thus, the configuration of control lines is simplified in the power converter 10 according to the embodiment. Therefore, an expensive and small-sized power converter can be provided. Further, since the control is simplified, the occurrence of false operations and troubles is inhibited.

In the case the switching patterns (2') and (3') are used as well as the switching patterns (2) and (3) in the first example of switching pattern of the method of controlling the power converter 10 according to the embodiment, the flying capacitors can be independently charged or discharged even when a voltage deviation occurs between the flying capacitors FC1 and FC4 or between FC2 and FC3 so that the voltage across the flying capacitors can be adjusted more finely and maintained at a constant level. In this case, too, the first flying capacitor circuit 11 and the second flying capacitor circuit 12 are controlled in coordination, and the third flying capacitor circuit 13 and the fourth flying capacitor circuit 14 are controlled in coordination. Therefore, the control lines for supplying gate signals from the control circuit to the gate terminals of the respective switching elements forming the power converter 10 may be comprised of four lines for controlling the switching elements forming the flying capacitor circuits 11 and 12, four lines for controlling the switching elements forming the flying capacitor circuits 13 and 14, and two lines for controlling the polarity of the output voltage by means of the switching elements in the output stage.

All of the switching patterns described above feed a power from the DC side to the AC side. As described above, however, the power converter 10 according to the embodiment can also feed a power from the AC side to the DC side. In this case, the currents flow in the opposite directions, and the flying capacitors are charged and discharged inversely.

A description will be given of a technology for maintaining the voltage across the flying capacitor constant in the method of controlling a power converter according to the embodiment.

Figure 8:
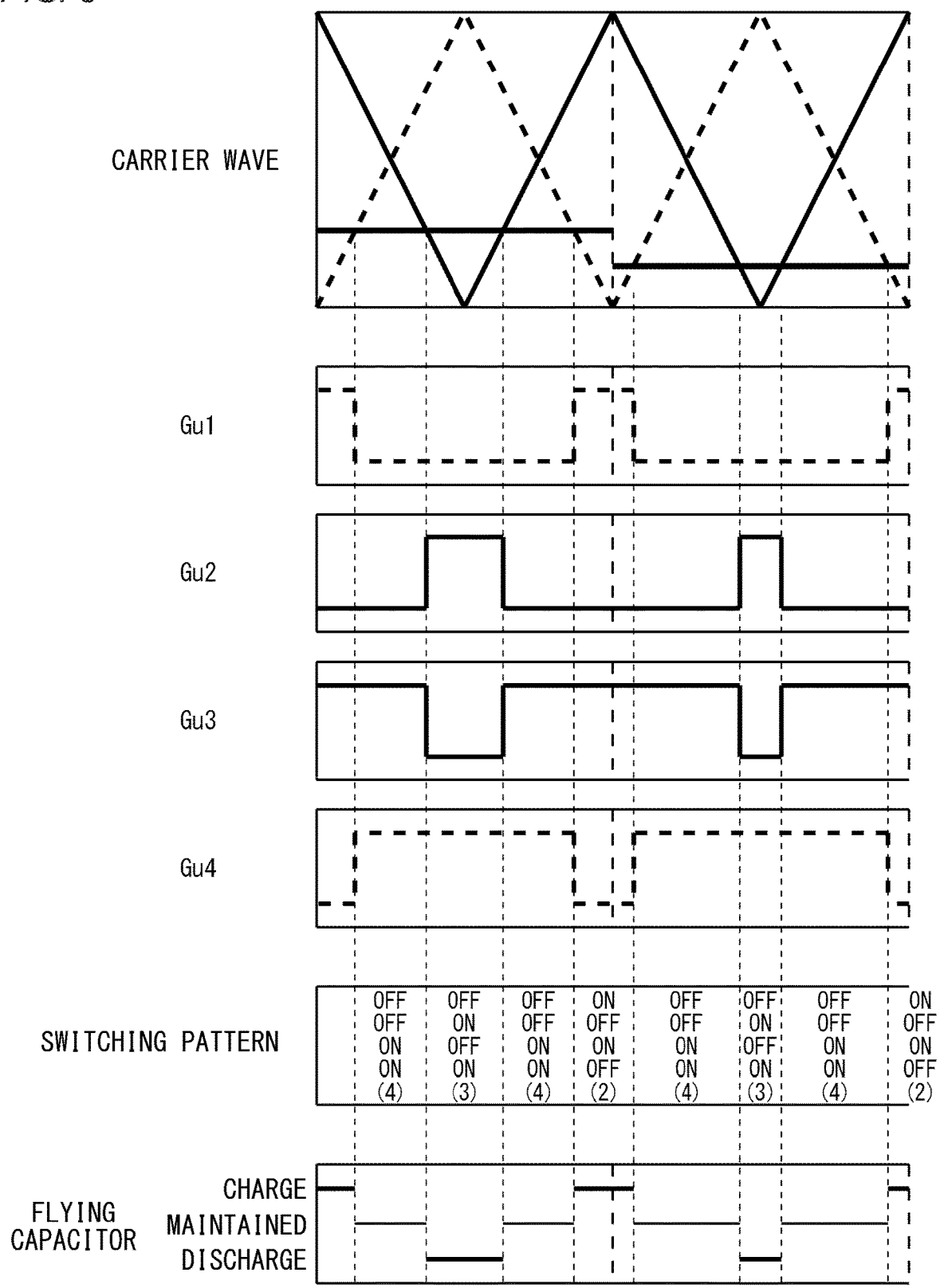
FIG. 8 shows a first example of the method of controlling a power converter according to the embodiment.

FIG. 8 shows a first example of the method of controlling a power converter according to the embodiment. In the first example, the duty ratio of the switching elements is controlled by using two carrier waves. As shown in the topmost row, gate signals Gu1 and Gu4 are generated by comparing a first carrier wave (solid line) that is a triangular wave with a reference signal for duty control. Gate signals Gu2 and Gu3 are generated by comparing a second carrier wave (broken line) derived from inverting the phase of the first carrier wave with a reference signal for duty control. The gate signals Gu1-Gu4 thus generated are shown in the second-fifth rows. The reference signal for duty control is adjusted in accordance with a voltage that the power converter 10 should output.

The gate signals Gu1-Gu4 thus generated are supplied to the switching elements via the control lines. In the first example, the switching patterns (2') and (3') are not used, and the switching patterns (2) and (3) are used. Therefore, the gate signal Gu1 is supplied to the switching elements S5$a$ and S6$a$, the inverted version of the gate signal Gu1 is supplied to S7$a$ and S8$a$, the gate signal Gu2 is supplied to S5$b$ and S6$b$, the inverted version of the gate signal Gu2 is supplied to S7$b$ and S8$b$, the gate signal Gu3 is supplied to the switching elements S5$c$ and S6$c$, and the inverted version of the gate signal Gu3 is supplied to S7$c$ and S8$c$, and the gate signal Gu4 is supplied to S5$d$ and S6$d$, and the inverted version of the gate signal Gu4 is supplied to S7$d$ and S8$d$. The switching pattern realized by the gate signals Gu1-Gu4 is shown in the sixth row, and the charge and discharge state of the flying capacitor is shown in the seventh row.

In the first example, gate signals are generated by using two carrier waves having inverted phases, and the duty ratio of the switching pattern is controlled by the gate signals thus generated. Therefore, as shown in the seventh row, the duration in which the flying capacitors FC1 and FC4 (FC2 and FC3) are charged in the switching pattern (2) can be configured to be equal, in each period, to the duration in which the flying capacitors FC1 and FC4 (FC2 and FC3) are discharged in the switching pattern (3). This establishes a balance between the duration in which the flying capacitor is charged and the duration in which it is discharged so that the voltage across the flying capacitor is maintained at a constant level.

Figure 9:
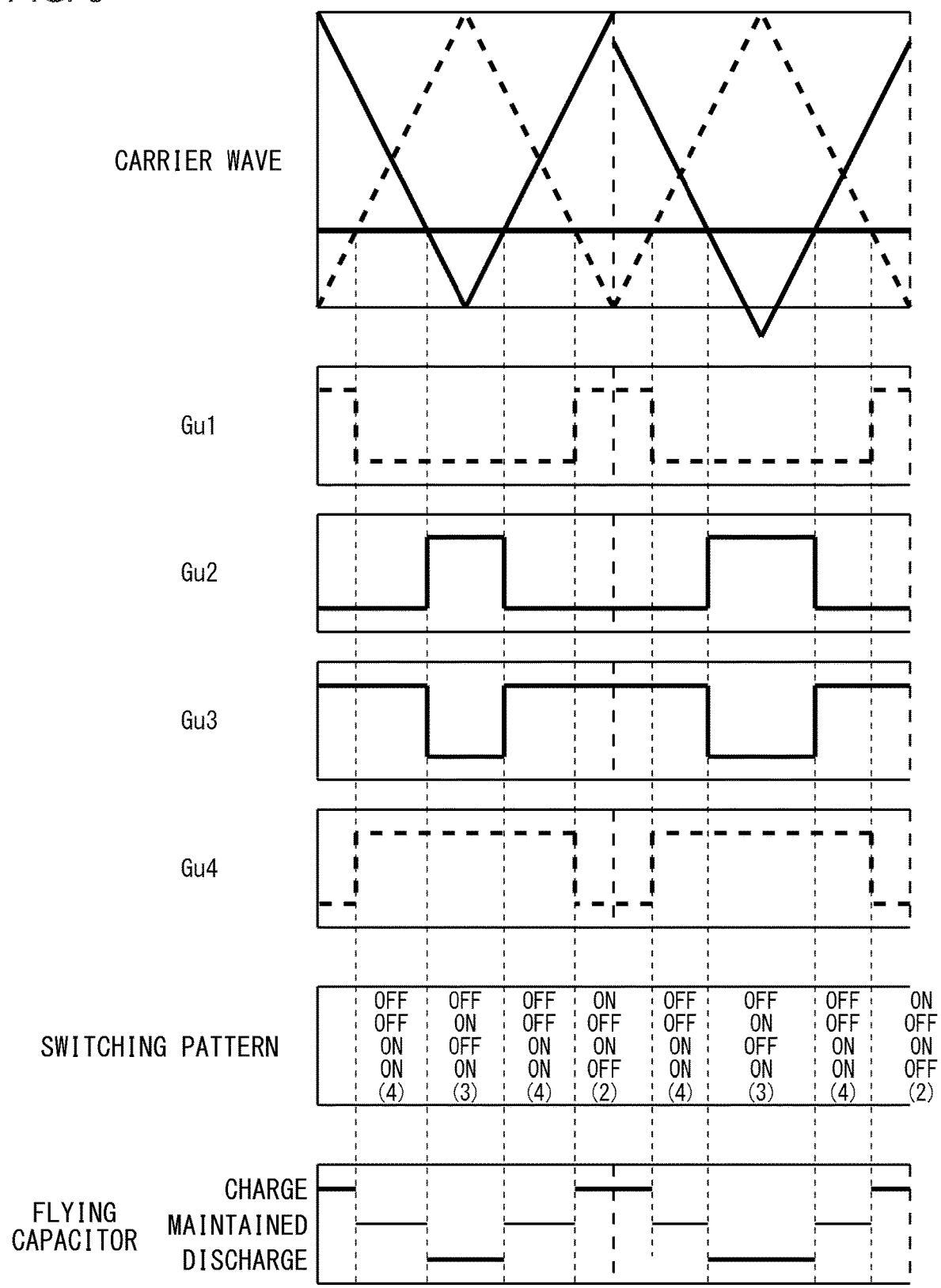
FIG. 9 shows a second example of the method of controlling a power converter according to the embodiment.

FIG. 9 shows a second example of the method of controlling a power converter according to the embodiment. In the second example, as in the first example, the duty ratio of the switching elements is controlled by using two carrier waves. The second example makes it possible to adjust the duty ratio by adjusting the level of the carrier wave in accordance with the voltage across the flying capacitor. Even if the duty control is being exercised as in the first example so that the duration of charge of the flying capacitor and the duration of discharge thereof are always equal, the voltage across the flying capacitor may be subjected to variation due to the variation in the element characteristics or the condition of the load, with the result that the voltage may deviate from a predetermined voltage. According to the second example, even if the voltage across the flying capacitor deviates from a predetermined value (e.g., E/4 [V]), the voltage across the flying capacitor can be maintained at a predetermined voltage by making it possible to adjust the duration of charge and the duration of discharge of the flying capacitor.

As shown in the topmost row, the two carrier waves having inverted phases have the same level in the first period, but the level of the first carrier wave denoted by the solid line is adjusted to be lower in the second period. This causes the duration in which the gate signal Gu2 generated by the first carrier wave is at the high level to be longer than in the first period and causes the duration in which the gate signal Gu3 generated by the first carrier wave is at the low level to be longer than in the first period. Therefore, the duration in which the switching pattern (3) is induced is configured to be longer than the duration in which the second switching pattern (2) is induced. Therefore, the duration in which the flying capacitor is charged is longer than the duration in which the flying capacitor is discharged, with the result that the flying capacitor is charged and the voltage is increased.

In the second example, as in the first example, the switching patterns (2) and (3) may be used without using the switching patterns (2') and (3'). However, using the switching patterns (2') and (3') in combination makes it possible to adjust the voltage across the flying capacitor on the U phase side and the voltage across the flying capacitor on the W phase side independently so that the variation in the voltage across the flying capacitor can be smoothed more finely and maintained at a predetermined level. For control according to the switching patterns (2') and (3'), the gate signals Gu1-Gu4 are inverted and supplied to the switching elements forming the third flying capacitor circuit 13 and the fourth flying capacitor circuit 14 on the W phase side.

In this case, there are further provided a first comparison circuit (not shown) that compares the voltage across the flying capacitor FC1 forming the first flying capacitor circuit 11 or the flying capacitor FC2 forming the second flying capacitor circuit 12 with a predetermined voltage and a second comparison circuit (not shown) that compares the voltage across the flying capacitor FC3 forming the third flying capacitor circuit 13 or the flying capacitor FC4 forming the fourth flying capacitor circuit 14 with a predetermined voltage.

In the case the voltage across the flying capacitor FC1 or FC2 is lower than E/4 [V], the level of the carrier wave is adjusted so that the duration of charge of the flying capacitor FC1 or FC2 will be longer than the duration of discharge in the next and subsequent periods. The gate signals generated by the carrier wave having the adjusted level are supplied to switching elements forming the first flying capacitor circuit 11 and the second flying capacitor circuit 12. In the case the voltage across the flying capacitor FC1 or FC2 is higher than E/4 [V], the level of the carrier wave is adjusted so that the duration of charge of the flying capacitor FC1 or FC2 will be shorter than the duration of discharge in the next and subsequent periods. The gate signals generated by the carrier wave having the adjusted level are supplied to switching elements forming the first flying capacitor circuit 11 and the second flying capacitor circuit 12.

In the case the voltage across the flying capacitor FC3 or FC4 is lower than E/4 [V], the level of the carrier wave is adjusted so that the duration of charge of the flying capacitor FC3 or FC4 will be longer than the duration of discharge in the next and subsequent periods. The gate signals generated by the carrier wave having the adjusted level are supplied to switching elements forming the third flying capacitor circuit 13 and the fourth flying capacitor circuit 14. In the case the voltage across the flying capacitor FC3 or FC4 is higher than E/4 [V], the level of the carrier wave is adjusted so that the duration of charge of the flying capacitor FC3 or FC4 will be shorter than the duration of discharge in the next and subsequent periods. The gate signals generated by the carrier wave having the adjusted level are supplied to switching elements forming the third flying capacitor circuit 13 and the fourth flying capacitor circuit 14.

The first comparison circuit may compare a predetermined voltage with the voltage across the flying capacitor forming the flying capacitor circuit connected to, of the switching elements S1a, S1b, S2a, and S2b in the output stage of the U phase, the switching element that is turned on. The second comparison circuit may compare a predetermined voltage with the voltage across the flying capacitor forming the flying capacitor circuit connected to, of the switching elements S3a, S3b, S4a, and S4b in the output stage of the W phase, the switching element that is turned on. For example, the voltage across the flying capacitor FC1 or FC3 forming the first flying capacitor circuit 11 or the third flying capacitor circuit 13 toward the top of the figure may be compared with a predetermined voltage in the case the high-side switching elements S1a and S1b or the high-side switching elements S3a and S3b are turned on. The voltage across the flying capacitor FC2 or FC4 forming the second flying capacitor circuit 12 or the fourth flying capacitor circuit 14 toward the bottom of the figure may be compared with a predetermined voltage in the case the low-side switching elements S2a and S2b or the low-side switching elements S4a and S4b are turned on. Accordingly, the flying capacitor is controlled to be charged or discharged based on the voltage across the flying capacitor located on the side where large current flows and changing heavily. Therefore, the voltages across the flying capacitors can be balanced more precisely and maintained at constant levels.

Four comparison circuits for comparing the voltage of each of the flying capacitors FC1-FC4 with a predetermined voltage may be provided so that the voltage of each flying capacitor can be independently adjusted. A comparison circuit for comparing the voltage of one of the flying capacitors FC1-FC4 with a predetermined voltage may be provided so that the voltage of all flying capacitors may be adjusted based on the voltage of the one flying capacitor.

Figure 10:
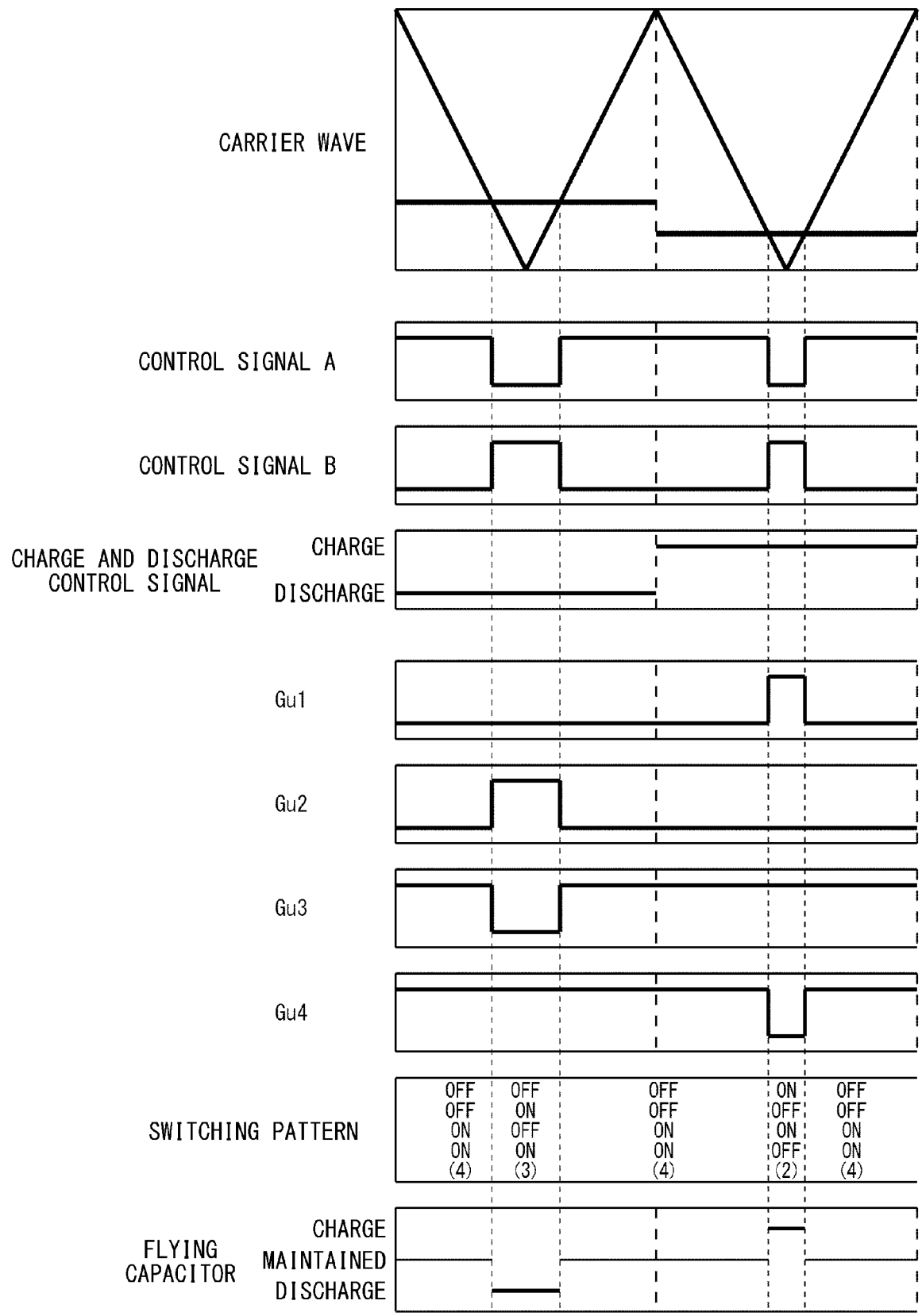
FIG. 10 shows a third example of the method of controlling a power converter according to the embodiment.

FIG. 10 shows a third example of the method of controlling a power converter according to the embodiment. In the third example, unlike the first and second examples, the duty ratio of the switching elements is controlled by using a single carrier wave.

The carrier wave and the reference signal for duty control shown in the topmost row are used to generate a control signal A shown in the second row and a control signal B shown in the third row. The control signal B is an inverted version of the control signal A. In the third example, as in the second example, a comparison circuit for comparing the voltage across the flying capacitor with a predetermined voltage is provided, and the output of the comparison circuit is used as a charge and discharge control signal shown in the fourth row. When the voltage across the flying capacitor is lower than the predetermined voltage, a high-level signal indicating charge is output in the next period. When the voltage across the flying capacitor is higher than the predetermined voltage, a low-level signal indicating discharge is output in the next period.

One of the control signal A and the control signal B is allocated to the gate signals Gu1-Gu4 shown in the fifth-eighth rows, depending on the state of the charge and discharge control signal. More specifically, a gate signal that produces a switching pattern for charging the flying capacitor is generated when the charge and discharge signal has a high level indicating charge, and a gate signal that produces a switching pattern for discharging the flying capacitor is generated when the charge and discharge signal has a low level indicating discharge. The switching pattern realized by the gate signals Gu1-Gu4 is shown in the ninth row, and the charge and discharge state of the flying capacitor is shown in the tenth row.

In the third example, as in the second example, all of the switching elements forming the first-fourth flying capacitor circuits may be controlled in coordination with reference to the voltage of one of the flying capacitors FC1-FC4 without using the switching patterns (2') and (3'). Alternatively, the switching patterns (2') and (3') may be used in combination so that the switching elements forming the first and second flying capacitor circuits are controlled in coordination with reference to the voltage across the flying capacitor FC1 or FC2 forming the first or second flying capacitor circuit on the U phase side, and the switching elements forming the third and fourth flying capacitor circuits are controlled in coordination with reference to the voltage across the flying capacitor FC3 or FC4 forming the third or fourth flying capacitor circuit on the W phase side. Optionally, four comparison circuits for comparing the voltage of each of the flying capacitors FC1-FC4 with a predetermined voltage may be provided so that the voltage of each of the flying capacitors can be independently adjusted, or only a comparison circuit for comparing the voltage of one of the flying capacitors FC1-FC4 with a predetermined voltage may be provided so that the voltage of all flying capacitors is adjusted based on the voltage of the one flying capacitor.

Figure 11:
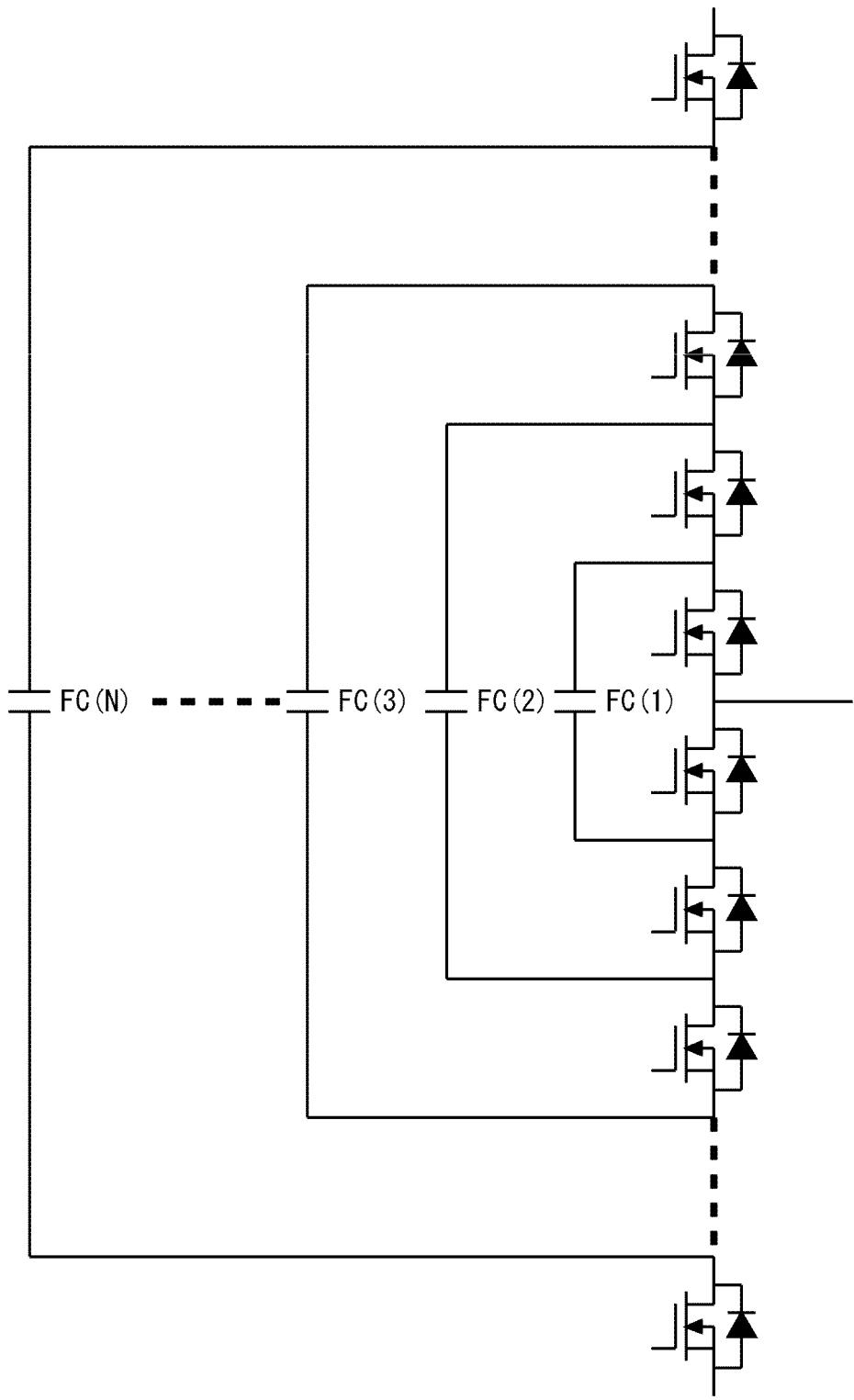
FIG. 11 shows another example of the flying capacitor circuit of the power converter according to the embodiment.
Figure 12:
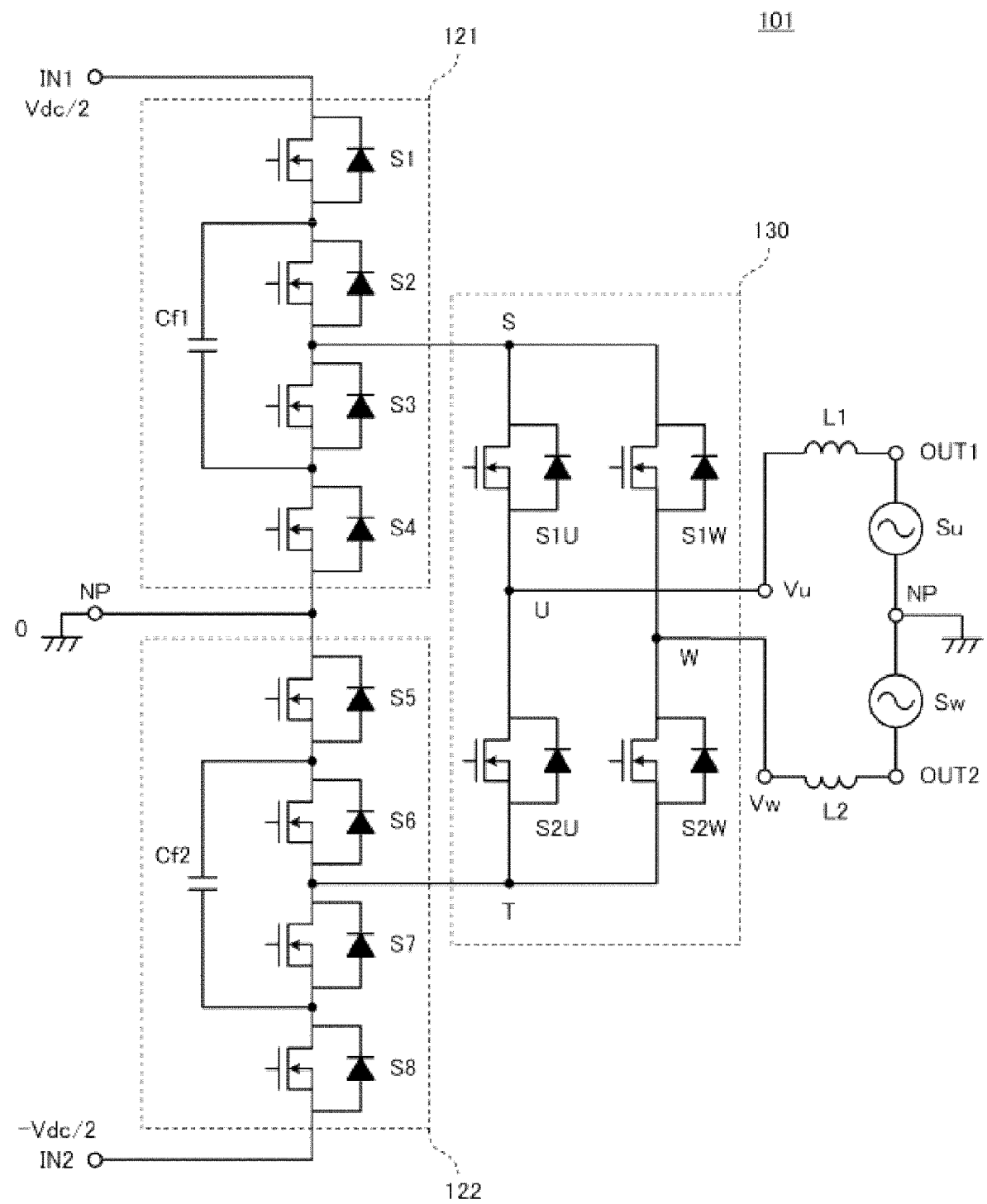
FIG. 12 is a circuit diagram of an inverter apparatus shown in FIG. 2 of patent document 1.

FIG. 11 shows another example of the flying capacitor circuit of the power converter 10 according to the embodiment. The power converter 10 in which three-level flying capacitor circuits are used is described above. Flying capacitor circuits capable of outputting output voltages of more than three levels may be used as the first-fourth flying capacitor circuits of the power converter 10. In the case of using two-stage flying capacitor circuits, for example, one switching element is additionally connected in series with each of the high-potential side and the low-potential side of the four switching elements forming a one-stage flying capacitor circuit. A second flying capacitor FC(2) is further connected between the respective nodes between the additional two switching elements and the existing switching elements. Similarly, an N-stage flying capacitor circuit (N is a natural number) is comprised of (2N+4) switching elements and N flying capacitors.

The voltage across the first capacitor FC(1) is controlled to be (1/(2N+2)) times the DC power supply voltage E, the voltage across the second capacitor FC(2) is controlled to be (2/(2N+2)) times the DC power supply voltage E, and the voltage across the N-th capacitor FC(N) is controlled to be (N/(2N+2)) times the voltage of the DC power supply voltage E. In this way, the N-stage flying capacitor circuit is capable of outputting (2N+1) levels of output voltage so that the power converter 10 comprised of four N-stage flying capacitor circuits is capable of outputting (2N+3) levels of voltage from the first output end OUT1 and the second output end OUT2.

A summary of an embodiment of the present disclosure is given below. A power converter according to an embodiment of the present disclosure includes: a first flying capacitor circuit and a second flying capacitor circuit connected in series so as to be in parallel with a DC power supply; a third flying capacitor circuit and a fourth flying capacitor circuit connected in series so as to be in parallel with the DC power supply and the first flying capacitor circuit and the second flying capacitor circuit connected in series; a first switching element and a second switching element connected in series between output terminals of the first flying capacitor circuit and the second flying capacitor circuit; a third switching element and a fourth switching element connected in series between output terminals of the third flying capacitor circuit and the fourth flying capacitor circuit; a first output terminal provided at a midpoint between the first switching element and the second switching element connected in series, and a second output terminal provided at a midpoint between the third switching element and the fourth switching element connected in series, wherein a node between the first flying capacitor circuit and the second flying capacitor circuit and a node between the third flying capacitor circuit and the fourth flying capacitor circuit are connected to a midpoint of the DC power supply voltage, and an AC power is output from the first output terminal and the second output terminal.

According to the embodiment, the withstand voltage of the first-fourth switching elements in the output stage can be lowered so that an inexpensive and high-performance power converter can be realized.

In the power converter, a half wave of the AC power may be generated while the first switching element and the fourth switching element are turned on and the second switching element and the third switching element are turned off, and a half wave of AC power of the opposite polarity may be generated while first switching element and the fourth switching element are turned off and the second switching element and the third switching element are turned on.

According to the embodiment, it is possible to output an output voltage that is closer to a pure sinusoidal wave so that the size of the LC filter can be reduced.

In the power converter, switching between a state, in which the first switching element and the fourth switching element are turned on, and the second switching element and the third switching element are turned off, and a state, in which the first switching element and the fourth switching element are turned off, and the second switching element and the third switching element are turned on, may be controlled to take place when a polarity of the AC power output from the first output terminal and the second output terminal is switched.

According to the embodiment, the first-fourth switching elements are controlled to operate only in concurrence with zero-crossing. Therefore, each of the first-fourth switching elements can be comprised of a plurality of switching elements connected in series.

The power converter may include a plurality of switching elements having a lower withstand voltage connected in series in place of the first switching element, the second switching element, the third switching element, or the fourth switching element.

According to the embodiment, the withstand voltage of the first-fourth switching elements in the output stage can be lowered further so that an inexpensive and high-performance power converter can be realized.

In the power converter, a difference between an output voltage of the first flying capacitor circuit and an output voltage of the second flying capacitor circuit and a difference between an output voltage of the third flying capacitor circuit and an output voltage of the fourth flying capacitor circuit may be controlled to be half the DC power supply voltage or smaller.

According to the embodiment, the withstand voltage of the first-fourth switching elements in the output stage can be lowered so that an inexpensive and high-performance power converter can be realized.

In the power converter according, the first flying capacitor circuit may include: a S5*a*-th switching element, a S5*b*-th switching element, a S5*c*-th switching element, and a S5*d*-th switching element connected in series; and a first capacitor FC1 connected between a node of the S5*a*-th switching element and the S5*b*-th switching element and a node of the S5*c* switching element and the S5*d*-th switching element, the second flying capacitor may circuit include: a S6*a*-th switching element, S6*b*-th switching element, a S6*c*-th switching element, and a S6*d*-th switching element connected in series; and a second capacitor FC2 connected between a node of the S6*a*-th switching element and the S6*b*-th switching element and a node of the S6*c*-th switching element and the S6*d*-th switching element, the third flying capacitor circuit may include: a S7*a*-th switching element, S7*b*-th switching element, a S7*c*-th switching element, and a S7*d*-th switching element connected in series; and a third capacitor FC3 connected between a node of the S7*a*-th switching element and the S7*b*-th switching element and a node of the S7*c*-th switching element and the S7*d*-th switching element, and the fourth flying capacitor circuit may include: a S8*a*-th switching element, S8*b*-th switching element, a S8*c*-th switching element, and a S8*d*-th switching element connected in series; and a fourth capacitor FC4 connected between a node of the S8*a*-th switching element and the S8*b*-th switching element and a node of the S8*c*-th switching element and the S8*d*-th switching element.

According to the embodiment, the withstand voltage of the all switching elements forming the power converter can be lowered to ¼ the DC power supply voltage so that an inexpensive and high-performance power converter can be realized.

In the power converter, the first flying capacitor circuit may include one capacitor, the second flying capacitor circuit may include one capacitor, the third flying capacitor circuit may include one capacitor, the fourth flying capacitor circuit may include one capacitor, a voltage across the one capacitor is controlled to be ¼ times the DC power supply voltage, and five levels of voltage are output from the first output terminal and the second output terminal.

According to the embodiment, the power converter capable of outputting five levels of output voltage can be comprised of switching elements having a low withstand voltage so that an inexpensive and high-performance power converter can be realized.

In the power converter, the first flying capacitor circuit includes N (N is a natural number) capacitors, the second flying capacitor circuit includes N (N is a natural number) capacitors, the third flying capacitor circuit includes N (N is a natural number) capacitors, the fourth flying capacitor circuit includes N (N is a natural number) capacitors, a voltage of a first capacitor is controlled to be (1/(2N+2)) times the DC power supply voltage, a voltage of a second capacitor is controlled to be (2/(2N+2)) times the DC power supply voltage, a voltage of an N-th capacitor is controlled to be (N/(2N+2)) times the DC power supply voltage, and (2N+3) levels of voltage may be output from the first output terminal and the second output terminal.

According to the embodiment, the power converter capable of outputting (2N+3) levels of output voltage can be comprised of switching elements having a low withstand voltage so that an inexpensive and high-performance power converter can be realized.

In the power converter, elements having a withstand voltage lower than the DC power supply voltage may be used for the switching elements of the first flying circuit, the switching elements of the second flying capacitor circuit, the switching elements of the third flying capacitor circuit, and the switching elements of the fourth flying capacitor circuit.

According to the embodiment, an inexpensive and high-performance power converter can be realized.

In the power converter, an element having a withstand voltage lower than the DC power supply voltage may be used for the first switching element, the second switching element, the third switching element, or the fourth switching element.

According to the embodiment, an inexpensive and high-performance power converter can be realized.

Optional combinations of the aforementioned constituting elements, and implementations of the disclosure in the form of methods, apparatuses, systems, recording mediums, and computer programs may also be practiced as additional modes of the present invention.

REFERENCE SIGNS LIST

10 power converter, 11 first flying capacitor circuit, 12 second flying capacitor circuit, 13 third flying capacitor circuit, 14 fourth flying capacitor circuit

INDUSTRIAL APPLICABILITY

The present disclosure is applicable to power converters.

The invention claimed is:

1. A power converter comprising:
   a first flying capacitor circuit and a second flying capacitor circuit connected in series so as to be in parallel with a DC power supply;
   a third flying capacitor circuit and a fourth flying capacitor circuit connected in series so as to be in parallel with the DC power supply and the first flying capacitor circuit and the second flying capacitor circuit connected in series;
   a first switching element and a second switching element connected in series between output terminals of the first flying capacitor circuit and the second flying capacitor circuit;
   a third switching element and a fourth switching element connected in series between output terminals of the third flying capacitor circuit and the fourth flying capacitor circuit;
   a first output terminal provided at a midpoint between the first switching element and the second switching element connected in series, and
   a second output terminal provided at a midpoint between the third switching element and the fourth switching element connected in series, wherein
   a node between the first flying capacitor circuit and the second flying capacitor circuit and a node between the third flying capacitor circuit and the fourth flying capacitor circuit are connected to a midpoint of a DC power supply voltage, and
   an AC power is output from the first output terminal and the second output terminal.

2. The power converter according to claim 1, wherein a half wave of the AC power is generated while the first switching element and the fourth switching element are turned on and the second switching element and the third switching element are turned off, and
   a half wave of AC power of the opposite polarity is generated while first switching element and the fourth switching element are turned off and the second switching element and the third switching element are turned on.

3. The power converter according to claim 1, wherein switching between a state, in which the first switching element and the fourth switching element are turned on, and the second switching element and the third switching element are turned off, and a state, in which the first switching element and the fourth switching element are turned off, and the second switching element and the third switching element are turned on, is controlled to take place when a polarity of the AC power output from the first output terminal and the second output terminal is switched.

4. The power converter according to claim 1, wherein a plurality of switching elements having a lower withstand voltage than the first switching element, the second switching element, the third switching element, or the fourth switching element are connected in series in place of the first switching element, the second switching element, the third switching element, or the fourth switching element.

5. The power converter according to claim 1, wherein a difference between an output voltage of the first flying capacitor circuit and an output voltage of the second flying capacitor circuit and a difference between an output voltage of the third flying capacitor circuit and an output voltage of the fourth flying capacitor circuit are controlled to be half the DC power supply voltage or smaller.

6. The power converter according to claim 1, wherein the first flying capacitor circuit includes:
   a S5$a$-th switching element, a S5$b$-th switching element, a S5$c$-th switching element, and a S5$d$-th switching element connected in series; and
   a first capacitor FC1 connected between a node of the S5$a$-th switching element and the S5$b$-th switching element and a node of the S5$c$ switching element and the S5$d$-th switching element, the second flying capacitor circuit includes:
a S6a-th switching element, S6b-th switching element, a S6c-th switching element, and a S6d-th switching element connected in series; and
a second capacitor FC2 connected between a node of the S6a-th switching element and the S6b-th switching element and a node of the S6c-th switching element and the S6d-th switching element,
the third flying capacitor circuit includes:
a S7a-th switching element, S7b-th switching element, a S7c-th switching element, and a S7d-th switching element connected in series; and
a third capacitor FC3 connected between a node of the S7a-th switching element and the S7b-th switching element and a node of the S7c-th switching element and the S7d-th switching element, and
the fourth flying capacitor circuit includes:
a S8a-th switching element, S8b-th switching element, a S8c-th switching element, and a S8d-th switching element connected in series; and
a fourth capacitor FC4 connected between a node of the S8a-th switching element and the S8b-th switching element and a node of the S8c-th switching element and the S8d-th switching element.

7. The power converter according to claim 1, wherein
the first flying capacitor circuit includes one capacitor,
the second flying capacitor circuit includes one capacitor,
the third flying capacitor circuit includes one capacitor,
the fourth flying capacitor circuit includes one capacitor,
a voltage across the one capacitor is controlled to be ¼ times the DC power supply voltage, and
five levels of voltage are output from the first output terminal and the second output terminal.

8. The power converter according to claim 1, wherein
the first flying capacitor circuit includes N (N is a natural number) capacitors,
the second flying capacitor circuit includes N (N is a natural number) capacitors,
the third flying capacitor circuit includes N (N is a natural number) capacitors,
the fourth flying capacitor circuit includes N (N is a natural number) capacitors,
a voltage across a first capacitor is controlled to be (1/(2N+2)) times the DC power supply voltage,
a voltage across a second capacitor is controlled to be (2/(2N+2)) times the DC power supply voltage,
a voltage across an N-th capacitor is controlled to be (N/(2N+2)) times the DC power supply voltage, and
(2N+3) levels of voltage are output from the first output terminal and the second output terminal.

9. The power converter according to claim 1, wherein
elements having a withstand voltage lower than the DC power supply voltage are used for switching elements of the first flying circuit, switching elements of the second flying capacitor circuit, switching elements of the third flying capacitor circuit, and switching elements of the fourth flying capacitor circuit.

10. The power converter according to claim 1,
an element having a withstand voltage lower than the DC power supply voltage is used for the first switching element, the second switching element, the third switching element, or the fourth switching element.

11. A power converter comprising:
a first flying capacitor circuit and a second flying capacitor circuit connected in series so as to be in parallel with a DC power supply;
a third flying capacitor circuit and a fourth flying capacitor circuit connected in series so as to be in parallel with the DC power supply and the first flying capacitor circuit and the second flying capacitor circuit connected in series;
a first switching element and a second switching element connected in series between output terminals of the first flying capacitor circuit and the second flying capacitor circuit;
a third switching element and a fourth switching element connected in series between output terminals of the third flying capacitor circuit and the fourth flying capacitor circuit;
a first output terminal provided at a midpoint between the first switching element and the second switching element connected in series, and
a second output terminal provided at a midpoint between the third switching element and the fourth switching element connected in series, wherein
a node between the first flying capacitor circuit and the second flying capacitor circuit and a node between the third flying capacitor circuit and the fourth flying capacitor circuit are connected to a midpoint of a DC power supply voltage,
an AC power is output from the first output terminal and the second output terminal,
a difference between an output voltage of the first flying capacitor circuit and an output voltage of the second flying capacitor circuit and a difference between an output voltage of the third flying capacitor circuit and an output voltage of the fourth flying capacitor circuit are controlled to be half the DC power supply voltage or smaller,
the first switching element, the second switching element, the third switching element, and the fourth switching element are controlled to operate when a polarity of the AC power output from the first output terminal and the second output terminal is switched, and
switching patterns of switching elements forming the first flying capacitor circuit, the second flying capacitor circuit, the third flying capacitor circuit, and the fourth flying capacitor circuit induced to output a voltage half the DC power supply voltage from the first output terminal and the second output terminal include a first switching pattern in which a flying capacitor forming the first flying capacitor circuit, the second flying capacitor circuit, the third flying capacitor circuit, or the fourth flying capacitor circuit is charged and a second switching pattern in which the flying capacitor is discharged.

12. The power converter according to claim 11, wherein
a duration in which the first switching pattern is induced and a duration in which the second switching pattern is induced are controlled to be in balance,
a first control signal is equally supplied to the switching elements forming the first flying capacitor circuit and to the switching elements forming the second flying capacitor circuit, and
a second control signal derived from inverting the first control signal is equally supplied to the switching elements forming the third flying capacitor circuit and to the switching elements forming the fourth flying capacitor circuit.

13. The power converter according to claim 11, further comprising:
a first comparison circuit and a second comparison circuit, the first comparison circuit comparing a voltage across a flying capacitor forming the first flying capacitor circuit or the second flying capacitor circuit with a predetermined voltage, and the second comparison circuit comparing a voltage across a flying capacitor forming the third flying capacitor circuit or the fourth flying capacitor circuit with the predetermined voltage, wherein when the voltage across the flying capacitor forming the first flying capacitor circuit or the second flying capacitor circuit is lower than the predetermined voltage, a control signal is equally supplied to the switching elements forming the first flying capacitor circuit and the second flying capacitor circuit so that the duration in which the first switching pattern is induced is longer than the duration in which the second switching pattern is induced, when the voltage across the flying capacitor forming the first flying capacitor circuit or the second flying capacitor circuit is higher than the predetermined voltage, a control signal is equally supplied to the switching elements forming the first flying capacitor circuit and the second flying capacitor circuit so that the duration in which the first switching pattern is induced is shorter than the duration in which the second switching pattern is induced, when the voltage across the flying capacitor forming the third flying capacitor circuit or the fourth flying capacitor circuit is lower than the predetermined voltage, a control signal is equally supplied to the switching elements forming the third flying capacitor circuit and the fourth flying capacitor circuit so that the duration in which the first switching pattern is induced is longer than the duration in which the second switching pattern is induced, and when the voltage across the flying capacitor forming the third flying capacitor circuit or the fourth flying capacitor circuit is higher than the predetermined voltage, a control signal is equally supplied to the switching elements forming the third flying capacitor circuit and the fourth flying capacitor circuit so that the duration in which the first switching pattern is induced is shorter than the duration in which the second switching pattern is induced.

14. The power converter according to claim 13, wherein
the first comparison circuit compares the voltage across the flying capacitor forming the flying capacitor circuit connected to, of the first switching element and the second switching element, the switching element that is turned on with the predetermined voltage, and the second comparison circuit compares the voltage across the flying capacitor forming the flying capacitor circuit connected to, of the third switching element and the fourth switching element, the switching element that is turned on with the predetermined voltage.

* * * * *